US007747517B2

(12) United States Patent
Sugano et al.

(10) Patent No.: US 7,747,517 B2
(45) Date of Patent: Jun. 29, 2010

(54) SYSTEM FOR ANONYMITY ELECTRONIC COMMERCE HAVING CREDITING FUNCTION AND METHOD

(75) Inventors: Kenichi Sugano, Chiyoda-ku (JP); Taichi Fujimoto, Chiyoda-ku (JP)

(73) Assignees: Riskmonster.com, Tokyo (JP); Nissho Iwai Corporation, Osaka (JP)

( * ) Notice: Subject to any disclaimer, the term of this patent is extended or adjusted under 35 U.S.C. 154(b) by 230 days.

(21) Appl. No.: 10/260,757

(22) Filed: Sep. 30, 2002

(65) Prior Publication Data

US 2003/0110123 A1 Jun. 12, 2003

Related U.S. Application Data

(63) Continuation of application No. PCT/JP01/02659, filed on Mar. 29, 2001.

(30) Foreign Application Priority Data

Mar. 29, 2000 (JP) ............................ 2000-092137
Sep. 4, 2000 (JP) ............................ 2000-267682

(51) Int. Cl.
*G06Q 40/00* (2006.01)

(52) U.S. Cl. .......................................... 705/38; 705/39

(58) Field of Classification Search ................. 235/380, 235/379, 381, 492; 379/91.02; 705/26, 27, 705/37, 40, 80, 2, 39, 34, 41, 54, 7, 8, 38; 382/115
See application file for complete search history.

(56) References Cited

U.S. PATENT DOCUMENTS 5,239,462 A * 8/1993 Jones et al. ................. 364/408
5,262,941 A * 11/1993 Saladin et al. .............. 364/408
5,649,116 A * 7/1997 McCoy et al. ............... 395/238
5,696,907 A * 12/1997 Tom ........................... 395/238
5,717,989 A 2/1998 Tozzoli et al.
5,732,400 A 3/1998 Mandler et al.

(Continued)

FOREIGN PATENT DOCUMENTS

WO WO 96/05563 2/1996

OTHER PUBLICATIONS

Saito et al. Privacy-Enhanced Access Control by SPKI and Its Application to Web Server, IEEE code: 0-7695-0798-9/00, 2000.*
Deidre Sullivan, "Aciom, Fair Issac Developing Risk Management Software", American Banker, Jun. 7, 1994, p. 17.*
Jackie Cohen, "Merchant server market heats up," Bank Technology News, Feb. 1997.*
"Wireless Services Solution", America's Network, p. 68, Sep. 15, 1998.*

*Primary Examiner*—Hani Kazimi
(74) *Attorney, Agent, or Firm*—Cohen Pontani Lieberman & Pavane LLP

(57) ABSTRACT

A commercial credit scoring method which enables a perfectly anonymous commercial transaction on a site built on a computer network. A person intended to newly participate as a seller or purchaser in a commercial transaction on the site is certified as a transactor when the person satisfies a given condition. A rank of the certified transactor is determined based on a given company data including at least one of a capital, sales amount, and transaction history about the transactor. A transaction limit in the transaction of the transactor is determined based on the rank, and a restraint is placed on the transaction when the amount of the transaction exceeds the transaction limit of the seller or purchaser. It is possible to perform an electronic commerce entirely in a perfectly anonymous manner including the business discussion, contract, settlement, and delivery.

18 Claims, 16 Drawing Sheets

U.S. PATENT DOCUMENTS

| | | | | | |
|---|---|---|---|---|---|
| 5,862,223 | A | * | 1/1999 | Walker et al. | 705/50 |
| 5,940,812 | A | * | 8/1999 | Tengel et al. | 705/38 |
| 6,029,149 | A | * | 2/2000 | Dykstra et al. | 705/38 |
| 6,061,789 | A | * | 5/2000 | Hauser et al. | 713/168 |
| 6,073,117 | A | * | 6/2000 | Oyanagi et al. | 705/38 |
| 6,088,686 | A | * | 7/2000 | Walker et al. | 705/38 |
| 6,138,907 | A | * | 10/2000 | Mori et al. | 235/279 |
| 6,233,566 | B1 | * | 5/2001 | Levine et al. | 705/36 R |
| 6,311,169 | B2 | * | 10/2001 | Duhon | 705/38 |
| 6,405,181 | B2 | * | 6/2002 | Lent et al. | 705/14 |
| 2002/0120563 | A1 | * | 8/2002 | McWilliam et al. | 705/39 |
| 2005/0171847 | A1 | * | 8/2005 | Ling | 705/14 |

* cited by examiner

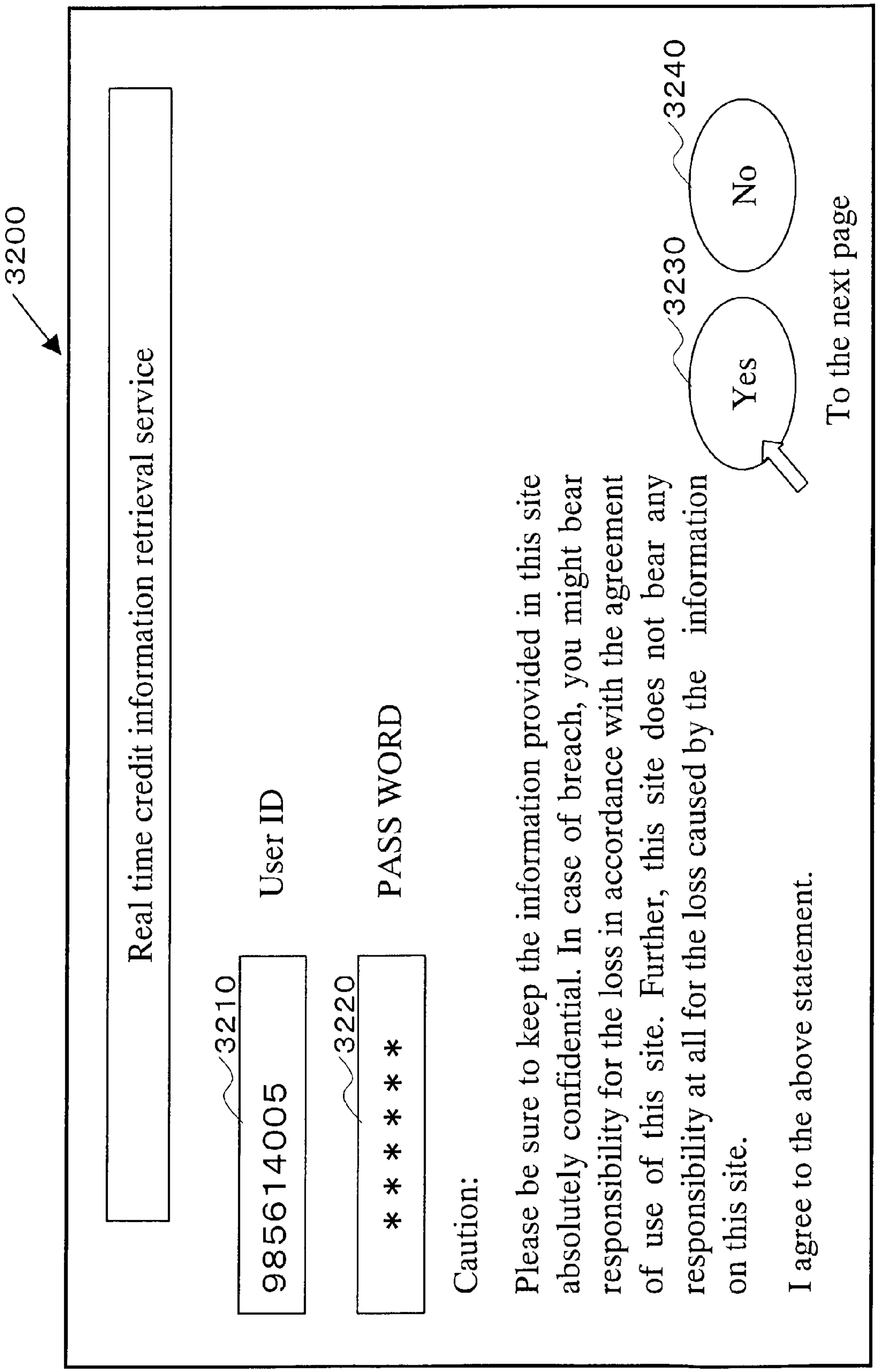

Real time credit information retrieval service

*3210* 985614005  User ID

*3220* * * * * *  PASS WORD

Caution:
Please be sure to keep the information provided in this site absolutely confidential. In case of breach, you might bear responsibility for the loss in accordance with the agreement of use of this site. Further, this site does not bear any responsibility at all for the loss caused by the information on this site.

I agree to the above statement.

*3230* Yes  *3240* No

To the next page

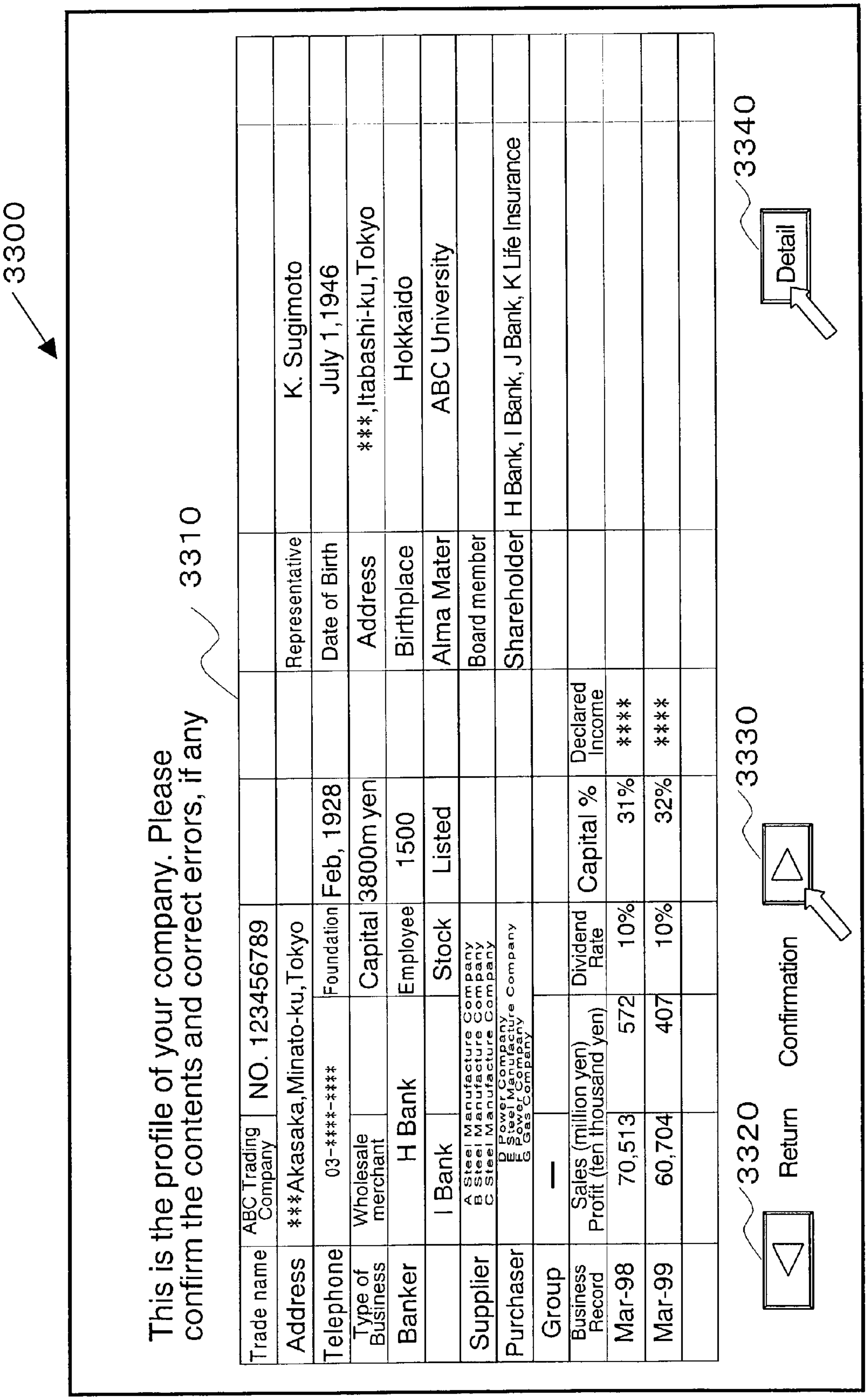

FIG. 11

This is the profile of your company. Please confirm the contents and correct errors, if any — 3310

3300

| Trade name | ABC Trading Company | NO. 123456789 | | | | | |
|---|---|---|---|---|---|---|---|
| Address | ***Akasaka,Minato-ku,Tokyo | | | | | Representative | K. Sugimoto |
| Telephone | 03-****-**** | Foundation | Feb, 1928 | | | Date of Birth | July 1, 1946 |
| Type of Business | Wholesale merchant | Capital | 3800m yen | | | Address | ***,Itabashi-ku,Tokyo |
| Banker | H Bank | Employee | 1500 | | | Birthplace | Hokkaido |
| | I Bank | Stock | Listed | | | Alma Mater | ABC University |
| Supplier | A Steel Manufacture Company<br>B Steel Manufacture Company<br>C Steel Manufacture Company | | | | | Board member | |
| Purchaser | D Power Company<br>E Steel Manufacture Company<br>F Power Company<br>G Gas Company | | | | | Shareholder | H Bank, I Bank, J Bank, K Life Insurance |
| Group | — | | | | | | |
| Business Record | Sales (million yen)<br>Profit (ten thousand yen) | Dividend Rate | Capital % | Declared Income | | | |
| Mar-98 | 70,513 | 572 | 10% | 31% | **** | | |
| Mar-99 | 60,704 | 407 | 10% | 32% | **** | | |

3320 Return

3330 Confirmation

3340 Detail

Figure 12:
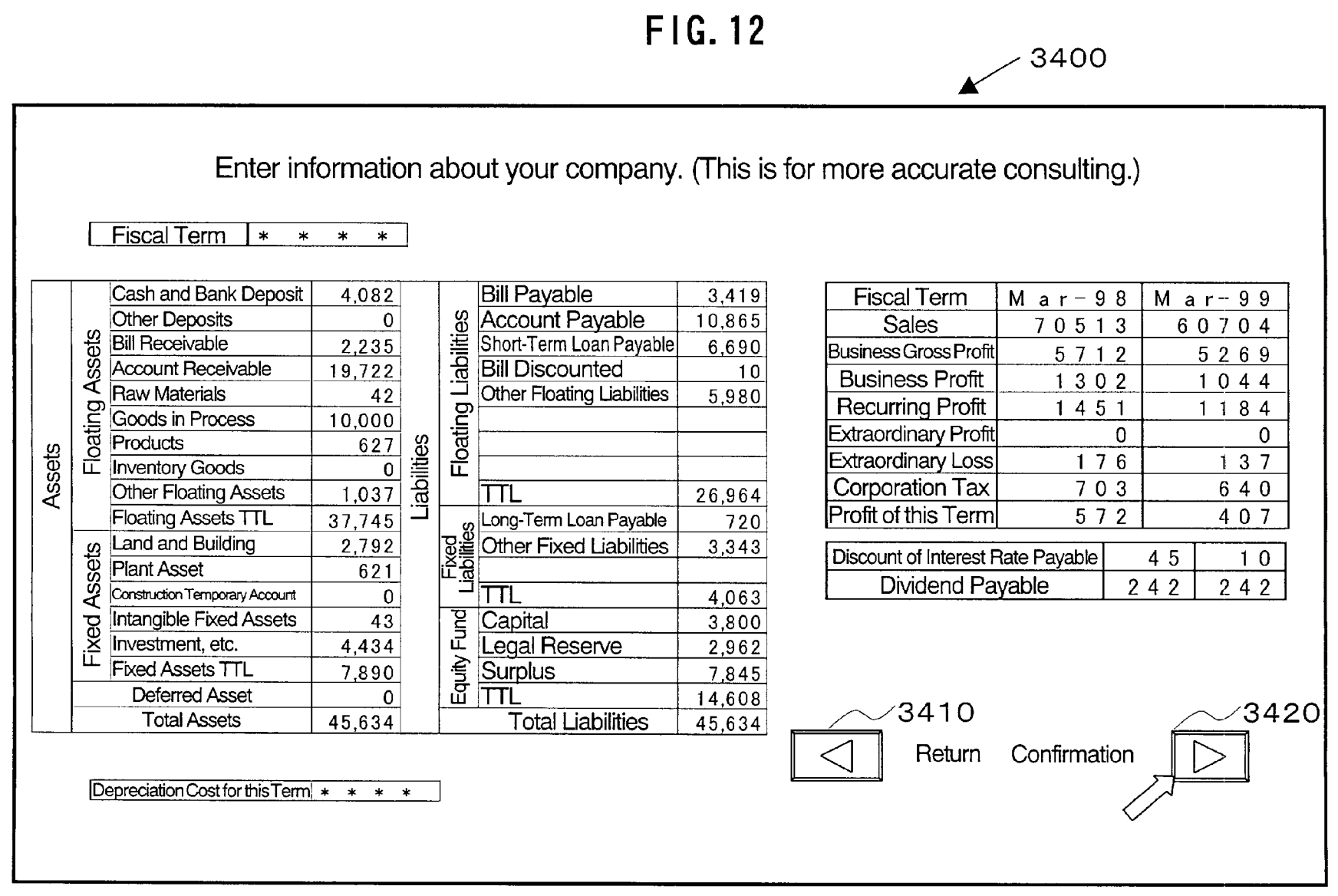

Enter information about your company. (This is for more accurate consulting.)

| Fiscal Term | * * * * |
|---|---|

| | | | | | | | |
|---|---|---|---|---|---|---|---|
| Assets | Floating Assets | Cash and Bank Deposit | 4,082 | Liabilities | Floating Liabilities | Bill Payable | 3,419 |
| | | Other Deposits | 0 | | | Account Payable | 10,865 |
| | | Bill Receivable | 2,235 | | | Short-Term Loan Payable | 6,690 |
| | | Account Receivable | 19,722 | | | Bill Discounted | 10 |
| | | Raw Materials | 42 | | | Other Floating Liabilities | 5,980 |
| | | Goods in Process | 10,000 | | | | |
| | | Products | 627 | | | | |
| | | Inventory Goods | 0 | | | | |
| | | Other Floating Assets | 1,037 | | | TTL | 26,964 |
| | | Floating Assets TTL | 37,745 | | Fixed Liabilities | Long-Term Loan Payable | 720 |
| | Fixed Assets | Land and Building | 2,792 | | | Other Fixed Liabilities | 3,343 |
| | | Plant Asset | 621 | | | | |
| | | Construction Temporary Account | 0 | | | TTL | 4,063 |
| | | Intangible Fixed Assets | 43 | | Equity Fund | Capital | 3,800 |
| | | Investment, etc. | 4,434 | | | Legal Reserve | 2,962 |
| | | Fixed Assets TTL | 7,890 | | | Surplus | 7,845 |
| | Deferred Asset | | 0 | | | TTL | 14,608 |
| | Total Assets | | 45,634 | | Total Liabilities | | 45,634 |

| Depreciation Cost for this Term | * * * * |
|---|---|

| Fiscal Term | Mar-98 | Mar-99 |
|---|---|---|
| Sales | 70513 | 60704 |
| Business Gross Profit | 5712 | 5269 |
| Business Profit | 1302 | 1044 |
| Recurring Profit | 1451 | 1184 |
| Extraordinary Profit | 0 | 0 |
| Extraordinary Loss | 176 | 137 |
| Corporation Tax | 703 | 640 |
| Profit of this Term | 572 | 407 |

| | | |
|---|---|---|
| Discount of Interest Rate Payable | 45 | 10 |
| Dividend Payable | 242 | 242 |

3410 Return

Confirmation 3420

Figure 15:
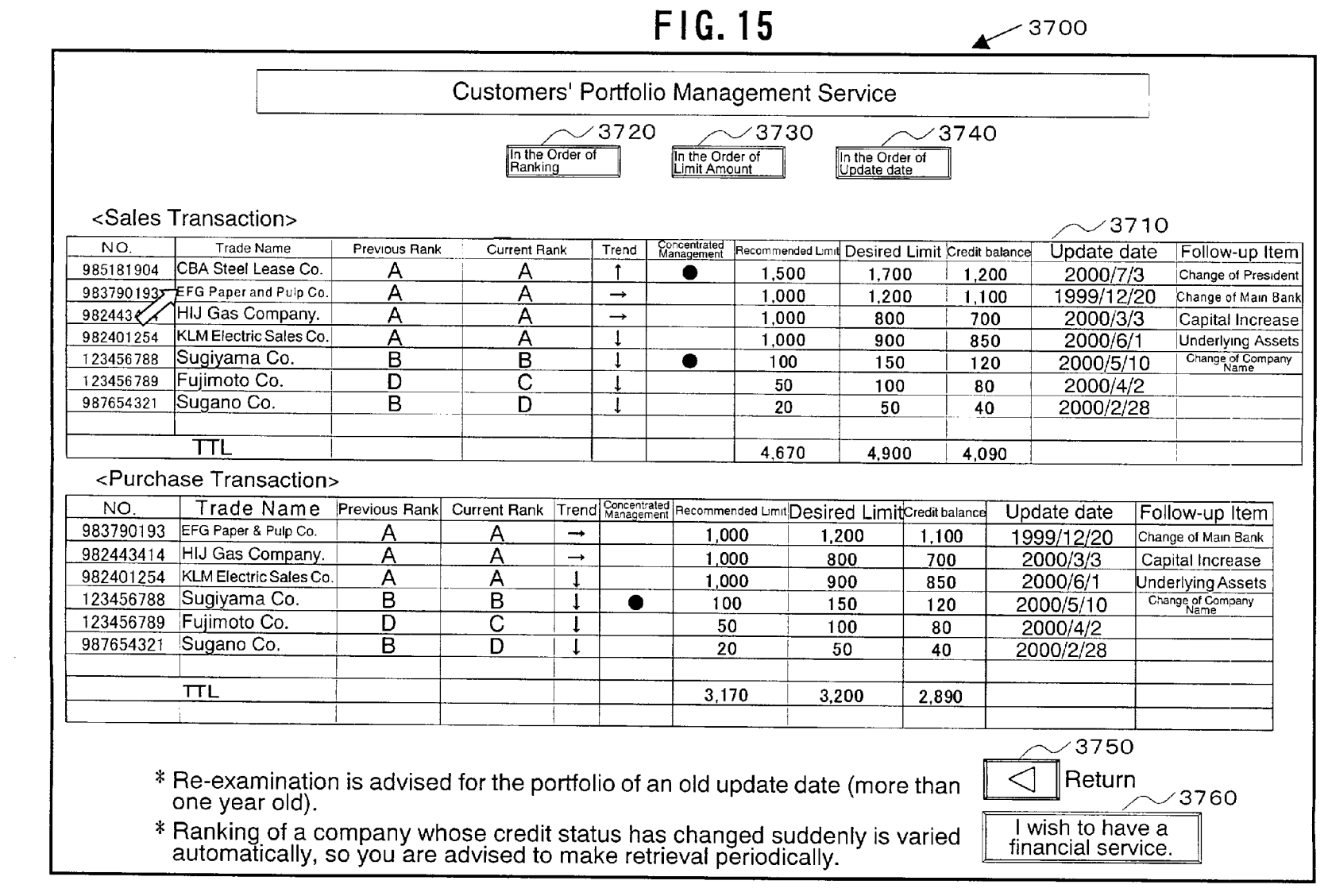

Customers' Portfolio Management Service

3720 [In the Order of Ranking] 3730 [In the Order of Limit Amount] 3740 [In the Order of Update date]

<Sales Transaction>

3710

| NO. | Trade Name | Previous Rank | Current Rank | Trend | Concentrated Management | Recommended Limit | Desired Limit | Credit balance | Update date | Follow-up Item |
|---|---|---|---|---|---|---|---|---|---|---|
| 985181904 | CBA Steel Lease Co. | A | A | ↑ | ● | 1,500 | 1,700 | 1,200 | 2000/7/3 | Change of President |
| 983790193 | EFG Paper and Pulp Co. | A | A | → | | 1,000 | 1,200 | 1,100 | 1999/12/20 | Change of Main Bank |
| 982443 | HIJ Gas Company. | A | A | → | | 1,000 | 800 | 700 | 2000/3/3 | Capital Increase |
| 982401254 | KLM Electric Sales Co. | A | A | ↓ | | 1,000 | 900 | 850 | 2000/6/1 | Underlying Assets |
| 123456788 | Sugiyama Co. | B | B | ↓ | ● | 100 | 150 | 120 | 2000/5/10 | Change of Company Name |
| 123456789 | Fujimoto Co. | D | C | ↓ | | 50 | 100 | 80 | 2000/4/2 | |
| 987654321 | Sugano Co. | B | D | ↓ | | 20 | 50 | 40 | 2000/2/28 | |
| | | | | | | | | | | |
| TTL | | | | | | 4,670 | 4,900 | 4,090 | | |

<Purchase Transaction>

| NO. | Trade Name | Previous Rank | Current Rank | Trend | Concentrated Management | Recommended Limit | Desired Limit | Credit balance | Update date | Follow-up Item |
|---|---|---|---|---|---|---|---|---|---|---|
| 983790193 | EFG Paper & Pulp Co. | A | A | → | | 1,000 | 1,200 | 1,100 | 1999/12/20 | Change of Main Bank |
| 982443414 | HIJ Gas Company. | A | A | → | | 1,000 | 800 | 700 | 2000/3/3 | Capital Increase |
| 982401254 | KLM Electric Sales Co. | A | A | ↓ | | 1,000 | 900 | 850 | 2000/6/1 | Underlying Assets |
| 123456788 | Sugiyama Co. | B | B | ↓ | ● | 100 | 150 | 120 | 2000/5/10 | Change of Company Name |
| 123456789 | Fujimoto Co. | D | C | ↓ | | 50 | 100 | 80 | 2000/4/2 | |
| 987654321 | Sugano Co. | B | D | ↓ | | 20 | 50 | 40 | 2000/2/28 | |
| | | | | | | | | | | |
| TTL | | | | | | 3,170 | 3,200 | 2,890 | | |
| | | | | | | | | | | |

* Re-examination is advised for the portfolio of an old update date (more than one year old).
* Ranking of a company whose credit status has changed suddenly is varied automatically, so you are advised to make retrieval periodically.

3750 [◁] Return

3760 [I wish to have a financial service.]

SYSTEM FOR ANONYMITY ELECTRONIC COMMERCE HAVING CREDITING FUNCTION AND METHOD

This application is a U.S. Continuation Application under 35 USC 371 of International Application PCT/JP01/02659 filed Mar. 29, 2001.

FIELD OF THE INVENTION

The present invention relates to an inter-business commerce on a computer network and, more particularly, to a system for managing a risk that arises in a commercial transaction on the computer network, and especially to a system for determining a credit in a settlement between companies. Further, the present invention relates especially to a closed-membership electronic commerce system where all participants in the system are made perfectly anonymous.

BACKGROUND OF THE INVENTION

In the commercial transaction between companies in the real world, not on the computer network, there is an intermediary agent such as a trading company between a supplying company (a seller) and a buying company (a purchaser). The agent determines a selling limit for an individual seller company based on its state of production capacity and quality control etc., and also determines a credit limit for a purchaser company based on its financial situation and mode of payment etc. for each transaction to promote the transaction such as settlement of draft. In other words, a large-scale commercial transaction is established by the intermediary agent such as a trading firm, which mediates an inter-business transaction through undertaking, for example, an inventory risk, and provides the so-called trading firm finance by providing a usance based on the settlement conditions and the like.

On the other hand, the electronic commerce (hereinafter abbreviated by "EC") on the computer network, a typical example of which is the Internet, has been increasingly spreading explosively in recent years, and in the EC, a form of EC between a company and an individual client (hereinafter abbreviated by "B-to-C") or between an individual client and another individual client (hereinafter abbreviated by "C-to-C") is becoming popular. However, because there is no safe form of EC established yet, such troubles as a fraudulent transaction, a complaint problem, and the like has occurred frequently, which is becoming a serious social problem. Particularly EC on the Internet is characterized in that it is highly anonymous and consequently, in spite of the fact that falsification of user can readily be made, it is difficult to detect it, and thus in the present situation, EC on the Internet accompanies very high risks for a credit transaction. Compared with EC in B-to-C and C-to-C, the commercial transaction between companies (hereinafter abbreviated by B-to-B) deals with large amount of value and has potentially more risks because of delay in establishing infrastructures for a settlement part, which is referred to so-called an Internet bank or the like.

Conventional EC on an EC site for B-to-B adopts a method where users participating in EC enter into negotiations anonymously until they come to an agreement with regard to their desired terms of transaction and, once having reached the agreement, both parties make their counter party public to decide the remaining terms (for example, delivery, settlement, etc.).

Because of its simplicity, easiness, and very high speed in completing the transaction compared to the commercial transaction in the real world, EC on the network is expected to form a large market in future. However, in order to maintain this merit of EC in the case of B-to-B also, it is necessary to grasp and manage the risks in real time in performing EC.

Also, in order to operate the EC site, it is common for a company user to pay a considerable amount of participation charge to be in the EC site since it costs in establishing and operating the EC site. If EC costs relatively inexpensive than a direct transaction in the real world, it is meaningful to participate for a user who wants to participate and do EC in spite of his paying the participation charge. In the above-described form of EC for B-to-B, when a company user participates in EC for the first time, the user has a chance to be able to get acquainted and matched with many business counter parties whom the user did not know before participating in EC. This is useful for the company user, but once a promising counter-party company has been found, the significance of participating in this EC site will be reduced. Especially, if the company users can negotiate in adjusting a desired price by themselves, there may be a case where the direct transaction without EC turns out to be inexpensive than EC, owing to an extra expense in the transaction due to the participation charge for the EC site and an intermediary charge.

SUMMARY OF THE INVENTION

In order to overcome the above-described disadvantage, the present invention is intended to provide real time credit determination, transaction limit management, complaint management, certification risk management and the like on a computer network, which is characterized as follows.

A credit scoring system according to the present invention is characterized in that a commercial credit scoring system for allowing commercial transactions to be performed through a site on a computer network comprises transactor certifying means for certifying as a transactor a person intended to participate as a seller or purchaser newly in a commercial transaction on the site when the person satisfies a given condition, rank setting means for determining a rank of the certificated transactor based on a given company data including at least one of a capital, sales amount, and transaction history about the transactor, and transaction-limit setting means for determining a transaction limit in the transaction of the transactor based on the rank determined by the rank setting means.

Further, the credit scoring system includes transaction restricting means for placing a restraint on the transaction when the amount of the transaction exceeds the transaction limit of the seller or purchaser, and the transaction restriction means is operable responsive to the excess over the transaction limit to give a warning to the seller or purchaser, or to suspend the transaction.

Moreover, the credit scoring system includes transaction-data managing means for organizing and managing a given transaction data about a previous transaction through the site for the certified transactor and, when the rank is determined, the transaction data in the transaction-data managing means is referred and considered according to a given condition.

Also, the credit scoring system is characterized in that the transaction data includes at least one of information selected from the group consisting of complaint information about the presence of a previous complaint against the transactor in the transaction, bankruptcy information of the transactor, information about a bad draft associated with the transactor, information about a seizing associated with the transactor, and apprehension information about the presence of an indication of failure in business associated with the transactor.

Further, the credit scoring system is characterized in that the transaction data includes information about the transactor's mode of payment in the transaction, wherein the transaction-data managing means is operable to check the information of the transactor's mode of payment at a given time intervals to reflect the checked information on the company data.

In a preferred embodiment, the credit scoring system according to the present invention is characterized in that the rank setting means is operable to evaluate the company data in numerical values so as to determine the rank based on the numerical evaluation.

Further, the credit scoring system is characterized in that, when the transactor properly conducts a given number or more of the transactions within a given time period, the rank setting means is operable to change the rank of the transactor higher.

Also, the credit scoring system is characterized in that, when the transactor conducts the transaction involving a given number or more of days of payment delay within a given time period, the rank setting means is operable to change the rank of the transactor lower.

In other preferred embodiment, the credit scoring system is characterized in that, when the transactor conducts at least two of the transactions involving a given number or more of days of payment delay within a given time period, the transaction restricting means is operable to suspend commercial transactions of the transactor on the site. Also, it is characterized in that these given conditions can be decided by a site owner.

Further, the credit scoring system is characterized in that the transaction-limit setting means is operable to determine the transaction limit based on an average monthly transaction value of the transactor and the numerical evaluation of the company data.

Also, in another preferred embodiment, the credit scoring system is characterized in that, when the respective determined transaction limits of the seller and purchasers are different from one another, the transaction restricting means is operable to suspend any commercial transaction to be conducted in excess of lower one of the determined transaction limits.

Still, according to another aspect of the present invention, a commercial credit scoring method according to the present invention for allowing commercial transactions to be conducted through a site on a computer network comprises the steps of certifying as a transactor a person intended to participate as a seller or purchaser newly in a commercial transaction on the site when the person satisfies a given condition, determining a rank of the certificated transactor based on a given company data including at least one of a capital, sales amount, and transaction history about the transactor, determining a transaction limit in the transaction of the transactor based on the rank, and when the amount of the transaction exceeds the transaction limit of the seller or purchaser, placing a certain restraint on the transaction.

Further, the method according to the present invention includes the step of identifying the transactor by a specific identification marker so as to allow the purchaser or seller to selectively conduct the transactions through the site, while allowing at least an owner of the site to know a name including a company name of the person participating in the transaction.

Also, according to still another aspect of the present invention, a program data delivering method for providing a signal representing a program on a carrier wave to a computer network comprises the steps of certifying as a transactor a person intended to participate as a seller or purchaser newly in a commercial transaction via the computer network when the person satisfies a given condition, determining a rank of the certificated transactor based on a given company data including at least one of a capital, sales amount, and transaction history about the transactor, determining a transaction limit in the transaction of the transactor based on the rank, and when the amount of the transaction exceeds the transaction limit of the seller or purchaser, placing a restraint on the transaction and giving a warning to the seller or purchaser or suspending the transaction.

Also, according to yet another aspect of the present invention, the program data delivering method is characterized in that a recording medium, which records the program data having an algorism according to the present invention, records at least a part of the program data comprising the steps of certifying as a transactor a person intended to participate as a seller or purchaser newly in a commercial transaction via a computer network when the person satisfies a given condition, determining a rank of the certificated transactor based on a given company data including at least one of a capital, sales amount, and transaction history about the transactor, determining a transaction limit in the transaction of the transactor based on the rank, and when the amount of the transaction exceeds the transaction limit of the seller or purchaser, placing a restraint on the transaction and giving a warning to the seller or purchaser or suspending the transaction.

Also, according to still another aspect of the present invention, a transmitting medium for transmitting the program data having the algorism according to the present invention transmits at least a part of the program comprising the steps of certifying as a transactor a person intended to participate as a seller or purchaser newly in a commercial transaction via a computer network when the person satisfies a given condition, determining a rank of the certificated transactor based on a given company data including at least one of a capital, sales amount, and transaction history about the transactor, and determining a transaction limit in the transaction of the transactor based on the rank.

Further, according to the present invention, a credit scoring system for providing corporate credit information through a site on a computer network to a user terminal comprises user certifying means for authorizing to access from the user terminal to the credit information in the site, user-information identifying means for identifying company information about the user authorized by the user certifying means, counter-party company identifying means for identifying at least one counter-party company, counter-party information displaying means for displaying the company information of the identified counter-party company, and desired transaction-limit entering means for allowing a desired transaction limit in a commercial transaction with the identified counter-party company to be entered from the user terminal, and by comparing the desired transaction limit entered from the user terminal with the company information about the identified counter-party company, provides a diagnosis of security of the transaction to the user terminal approximately in real time.

Further, the credit scoring system is characterized in that the user-information identifying means further includes user-information correction means for allowing the user authorized by the user certifying means to correct the company information of the user directly from the user terminal.

Further, the credit scoring system is characterized in that the desired transaction-limit entering means further includes means for entering at least a monthly transition value and the number of months for payback, the desired transaction-limit entering means being operable to multiply the entered monthly transition value by the entered number of months for payback so as to allow the desired transaction limit to be entered in the form of the derived product.

Moreover, the credit scoring system further includes bankruptcy-probability evaluating means for evaluating the probability of bankruptcy in the counter-party company based on the rank determined by the rank setting means, and commission-rate evaluating means for calculating a sum of at least the bankruptcy probability obtained from the bankruptcy-probability evaluating means, a capital cost rate of the counter-party company, and an expense rate of the counter-party company to provide a minimum requisite commission rate.

Further, the credit scoring system further includes means for dividing the difference between the transaction limit of the counter-party company and the desired transition limit by the number of months for payback to evaluate a target transaction value per month.

In a preferred embodiment, a counter-party company managing system according to the present invention comprises counter-party company managing means operable to provide company information of one or more of counter-party companies evaluated by the credit scoring system to a user by displaying a specific management page on a screen of a user terminal so that the user can compare them.

Further, the counter-party company managing system is characterized in that the managing means includes information about at least the rank, the limit, and an evaluation date of the counter-party company in question with respect to each of counter-party companies, and allows a user to evaluate the counter-part company based on desired information selected from the company information.

Also, according to another aspect of the present invention, a commercial credit scoring method for providing corporate credit information through a site on a computer network to a user terminal comprises the steps of certifying as a user a person intended to access to the credit information when the person satisfies a given condition, providing the company information of a desired counter-party company to the certified user, prompting the certified user to enter a desired transaction limit in a commercial transaction with the counter-part company, and evaluating the entered desired transaction limit and the company information of the desired counter-party company to provide an diagnosis of security in the transaction to the user approximately in real time.

Moreover, the commercial credit scoring method according to the present invention further includes the step of prompting the certified user to correct the company information of the user through a user terminal.

Further, the commercial credit scoring method according to the present invention is characterized in that the step of prompting the certified user to enter the desired transaction limit includes the steps of prompting the certified user to enter at least monthly transition value and the number of months for payback, and multiplying the entered monthly transition value by the entered number of months for payback to determine the desired transaction limit.

Further, the commercial credit scoring method according to the present invention includes the steps of calculating the probability of bankruptcy in the counter-party company based on the rank determined by the rank setting means, setting a sum of at least the bankruptcy probability, a capital cost rate of the counter-party company and an administration expense rate of the counter-party company as a minimum requisite commission rate, and providing the minimum requisite commission rate to the certified user.

Further, the commercial credit scoring method according to the present invention includes the steps of dividing the difference between the transaction limit of the counter-party company and the desired transition limit by the number of months for payback to determine a target transaction value per month, and providing the target transaction value to the certified user.

Also, according to still another aspect of the present invention, a counter-party company managing method according to the present invention is characterized in that company information of one or more of counter-party companies provided by the commercial credit scoring method is provided to a user by displaying a specific management page on a screen of a user terminal so that the user can compare them.

Also, according to yet another aspect of the present invention, an electronic commerce system according to the present invention for providing a user interface to a screen of a user terminal to allow a user certified by user certifying means to receive a given financial service so as to conduct a commercial transaction with one or more of counter-party companies registered in a counter-party company managing system comprises financial-service selecting means for allowing the user to select one or more of financial services, and service applicable-condition entering means for allowing the user to enter a condition for the user to receive the financial service.

Also, according to still another aspect of the present invention, an electronic commerce method according to the present invention for providing a given financial service to a user certified by user certifying means to conduct a commercial transaction with a counter-party company through a site on a computer network comprises the steps of prompting the user to select one or more of the financial services and prompting the user to enter a condition for providing the financial service.

BRIEF DESCRIPTION OF THE DRAWINGS

FIG. 10 illustrates an example of a user certification page of a real time credit information retrieval service according to a preferred embodiment of the invention;

FIG. 11 illustrates an example of a page displaying a user business profile in the real time credit information retrieval service according to a preferred embodiment of the invention;

FIG. 12 illustrates an example of the page displaying a more detailed user business profile and financial information in the real time credit information retrieval service according to a preferred embodiment of the invention;

FIG. 15 illustrates an example of a portfolio management service page for the counter-party company in the real time credit information retrieval service according to another preferred embodiment of the invention.

DETAILED DESCRIPTION OF PREFERRED EMBODIMENTS

Figure 1:
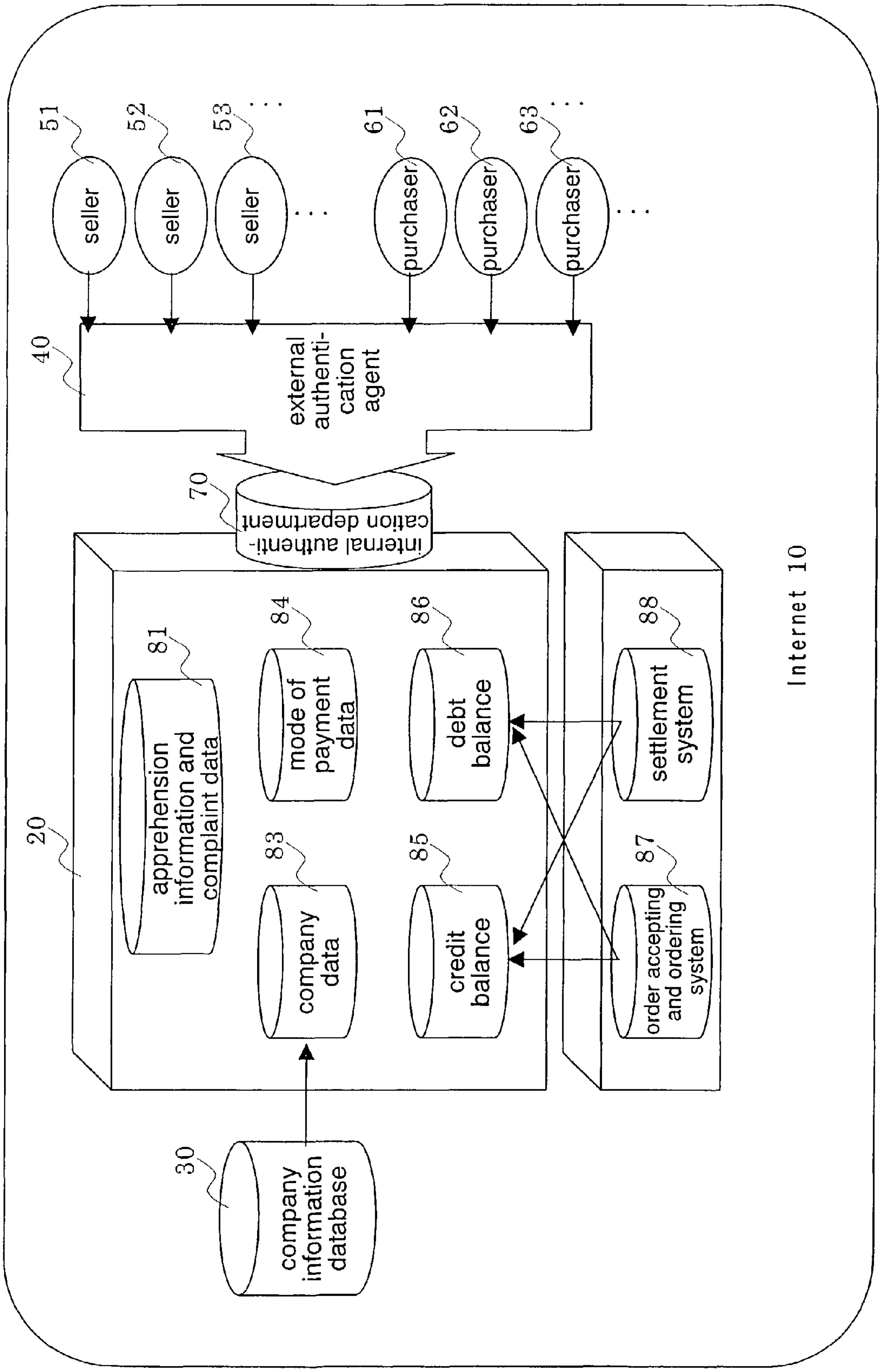
FIG. 1 illustrates a schematic block diagram of a credit judgment system according to a preferred embodiment of the invention.

FIG. 1 is a schematic diagram of a network system where a credit judgment system according to the invention operates. The system comprises an EC risk management site 20 accessible on the Internet 10, a company information database 30, and an authentication agent 40. In a preferred embodiment, the company information database can be, for example, the business profile database COSMOS 2 that is provided by Teikoku Databank Ltd. having its own scored evaluation. In order to carry out EC on this EC risk management site 20, sellers (51, 52, . . . ) and purchasers (61, 62, . . . ), who are connecting to the Internet, log on the site 20 through the authentication agent 40.

Figure 2:
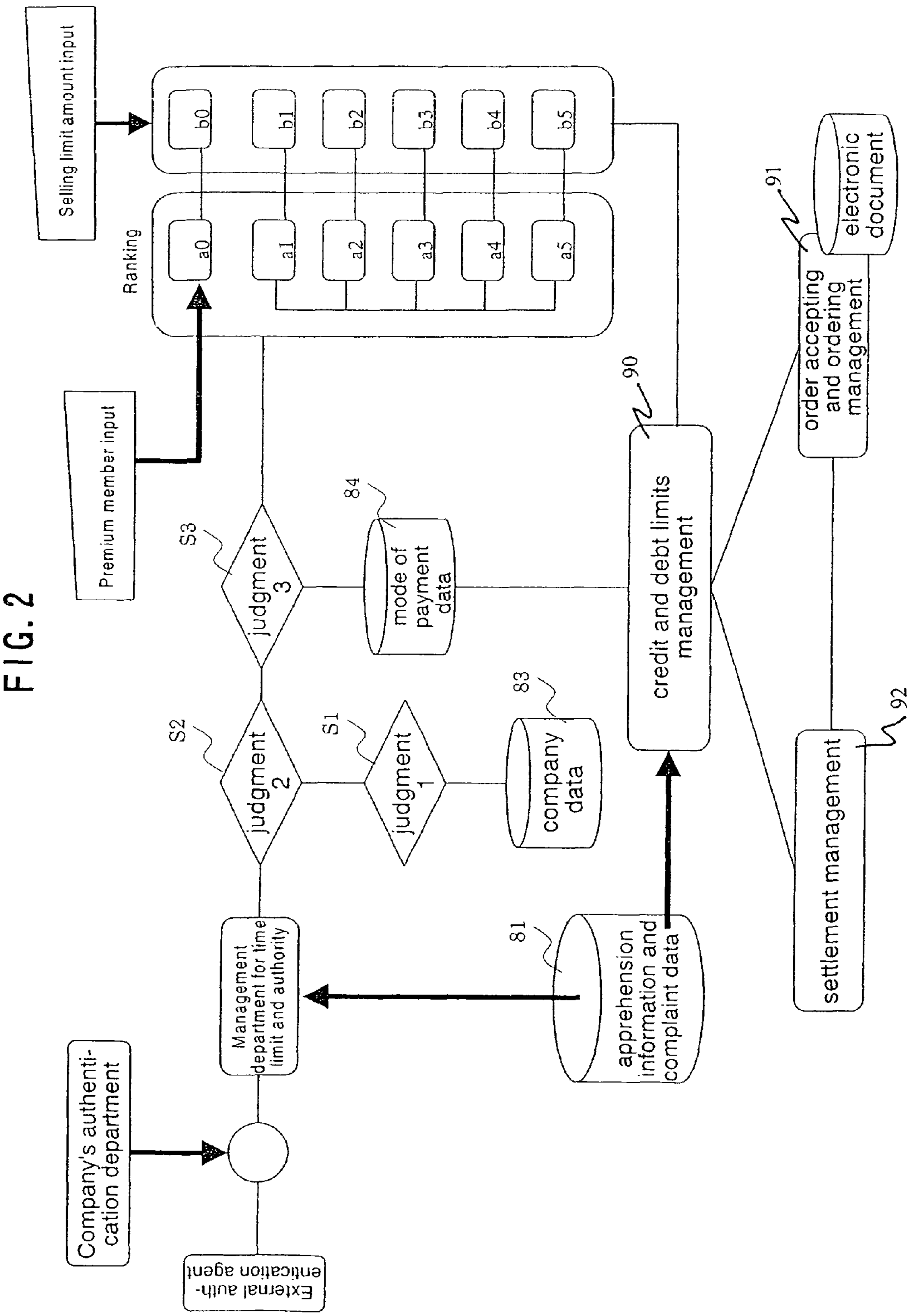
FIG. 2 illustrates a schematic block chart showing a method of credit judgment according to a preferred embodiment of the invention.

FIG. 2 shows a schematic block diagram of the EC risk management site 20. The seller and purchaser, who are users, log on the site 20 through the external authentication agent 40. Upon logging on, certification is performed in the site authentication department 70 provided by a managing body of the site 20. The site authentication department 70 certifies the user, and also attaches a management number and a time limit to each certification. Then, in a management authority 80 of the time limit and the authority, the management of the time limit of a certification and the transaction authority is performed with reference to pre-registered complaint data 81 and apprehension information data 82 etc. as well as in terms of whether or not any complaint and/or apprehension information arises and if so the extent thereof, whereby even when an unexpected situation suddenly arises, it performs the management of the transaction authority such as suspension of the transaction.

Then, the credit judgment is performed for managing the risks involved in user's EC. Based on the judgments S1 to S3 in FIG. 2, "judgment of selling limit", "judgment of buying limit" (or rank setting), and "adjustment of buying limit depending on the mode of payment" are performed respectively. The buying limit corresponding to the rank is determined in advance, the buying limit and the rank are made associated with each other to check whether the transaction is proceeding within the determined selling and buying limits, and if the transaction exceeds the limit, a warning is generated or otherwise the transaction is made suspended. Each judgment will now be described in more detail.

Judgment of Selling Limit

Figure 3:
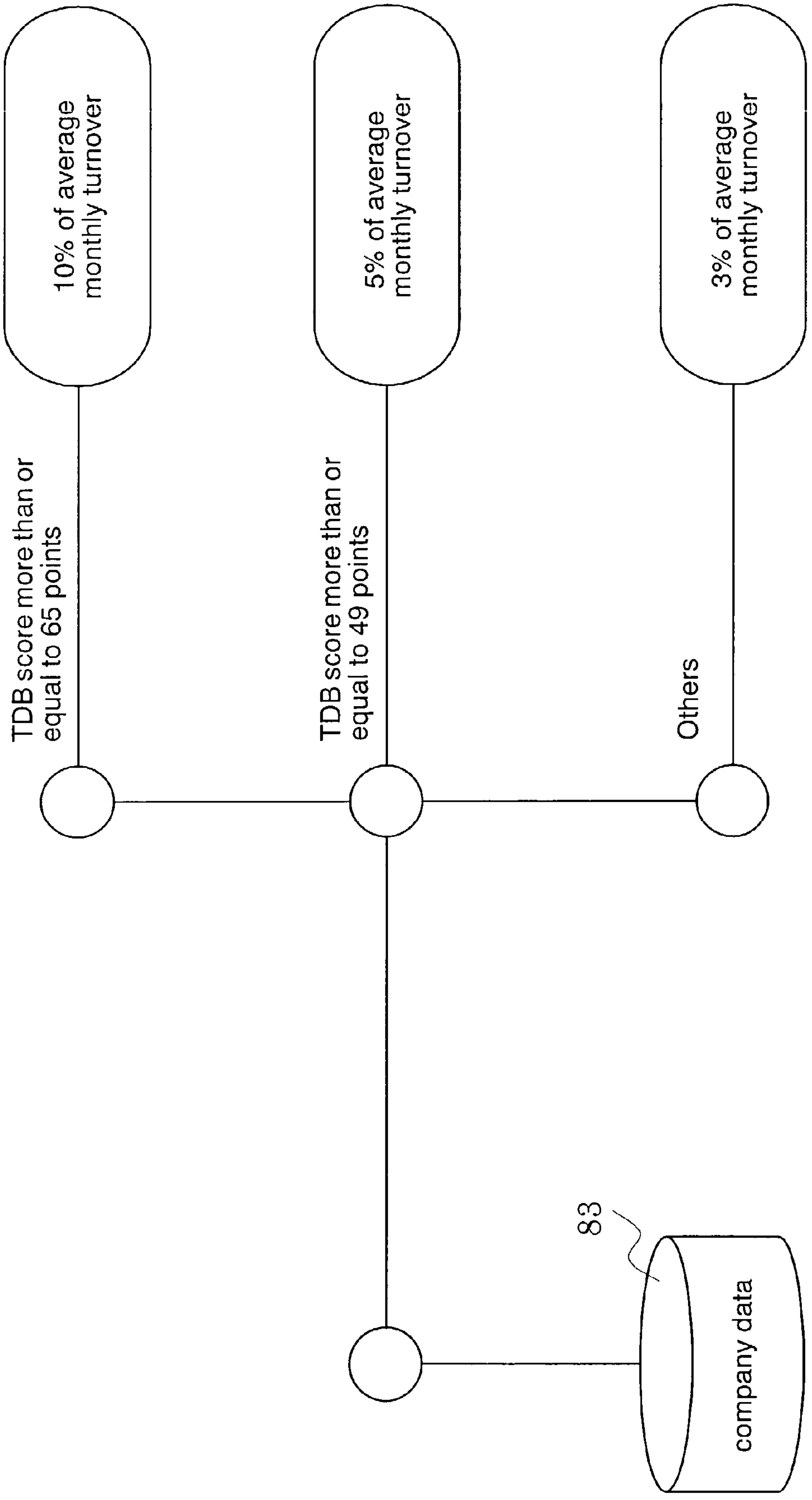
FIG. 3 illustrates a block chart showing a method for determining a selling limit in EC according to a preferred embodiment of the invention.

FIG. 3 shows a particular example of the judgment of the selling limit in judgment 1 shown in FIG. 2. Here, a company data 83 is the data received from the company information database 30, which is preferably the corporate profile database COSMOS 2 provided by Teikoku Databank Ltd. In this embodiment, the company data 83 is based on the data of COSMOS 2 and provided with a score as a corporate profile data. The selling limit for the seller company participating in this site 20 is determined based on the scores of COSMOS 2: a company with the score more than or equal to 65 points is up to 10% of the monthly turnover; a company with the score more than or equal to 49 points but less than 65 points is up to 5% of the monthly turnover; and the other company is up to 3% of the monthly turnover. These judgments are made every given period of time to thereby determine the selling limit. The owner of this site 20 can arbitrarily decide this period of time. The term "selling limit" means herein the amount of money that the seller can sell goods on credit on this site or, from the point of view of the site owner or the purchaser, it means a limit amount for accounts payable debt balance.

Judgment of Buying Limit

Figure 4:
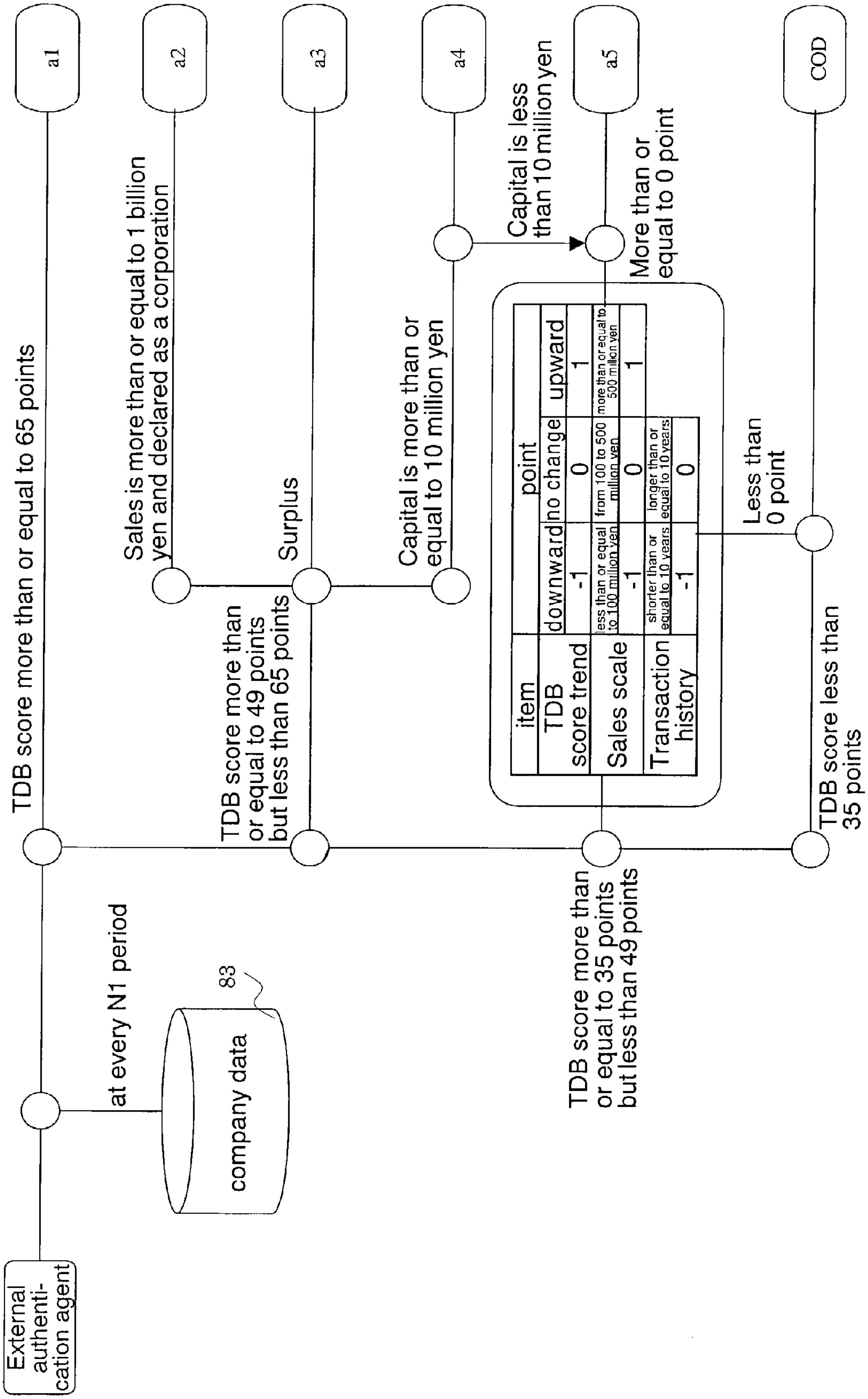
FIG. 4 illustrates the block chart showing the method for determining a buying limit in EC according to a preferred embodiment of the invention.

FIG. 4 shows a particular example of the judgment of the buying limit in judgment 2 shown in FIG. 2. In order to determine the buying limit by using the company data 83 for every period of time that can be decided arbitrarily by the owner of this site, ranking is performed. The term "buying limit" means the amount of money that the purchaser is allowed to buy goods on credit in this site or, from the standpoint of the site owner or the seller, a limit amount for selling credit obligation. In a preferred embodiment, six different ranks, a1 to a5 and COD, are determined. COD stands for Cash On Delivery and is a rank irrelevant to crediting. The buying limit for the purchaser company participating in this site 20 is determined based on the scores of COSMOS 2: a1 for the company having a score more than or equal to 65 points, a2 for the company being registered as a corporation, having a score more than or equal to 49 points but less than 65 points and an annual turnover of more than or equal to one billion yen, a3 for the company having a score more than or equal to 49 points but less than 65 points and a surplus account settlement, a4 for the company having a score more than or equal to 49 points but less than 65 points and a capital of more than or equal to 10 million yen, and a5 for the company having a score more than or equal to 49 points but less than 65 points and a capital less than 10 million yen. Further, as for the companies having a score more than or equal to 35 points but less than 49 points, they are converted to scores based on the items as listed in Table 1 and ranked as a5 for the company having a total score more than or equal to 0 and COD for the company having the total score less than 0. For example, in the case of a company whose score trend of COSMOS 2 is upward (+1 point), sales amount is 50 million yen (−1 point), and transaction history is 11 years (0 point), it has a total point of +1−1+0=0 and thus the rank of a5. As another example, in the case of a company whose score trend of COSMOS 2 is downward (−1 point), sales amount is 400 million yen (0 point), and transaction history is 9 years (−1 point), it has the total point of −1+0−1=−2 and thus the rank of COD. Further, a company whose score of COSMOS 2 is less than 35 points is unconditionally ranked COD and outside of crediting.

Adjustment of Buying Limit Based on the Mode of Payment

Figure 5:
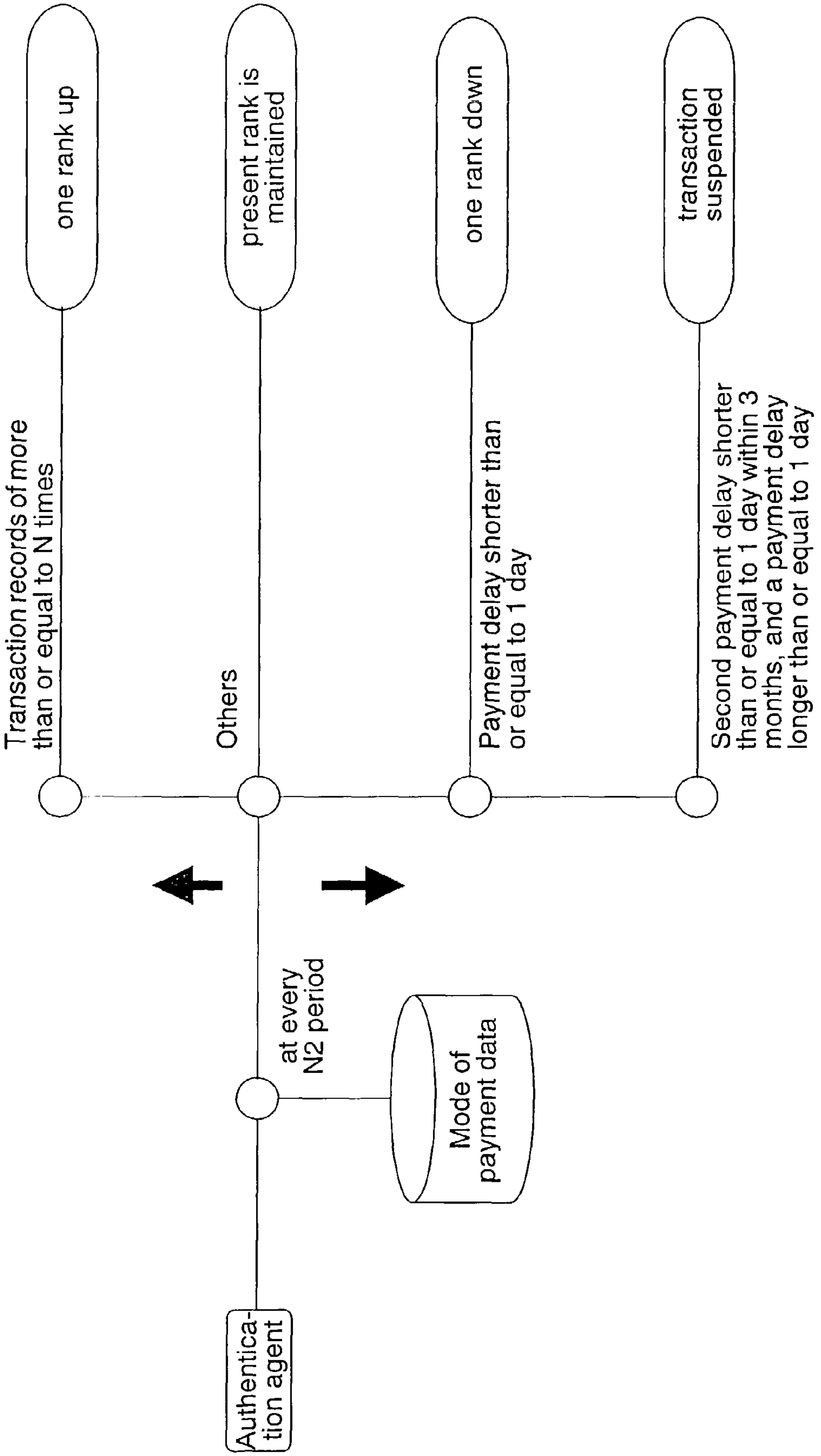
FIG. 5 illustrates the block chart showing a method for adjusting a rank of the buying limit in EC according to a preferred embodiment of the invention.

FIG. 5 shows a particular example of adjustment of the buying limit based on the mode of payment in judgment 3 shown in FIG. 2. For each period of time, which the owner of this site 20 can decide arbitrarily, the rank determined in the step of the above-described judgment 2 is adjusted by use of the mode of payment data 84 so that the rank is increased or decreased. In a preferred embodiment, a company that has achieved a certain number of transactions that exceeds a predetermined number of transaction achievement can be raised by one rank. The owner of this site 20 can decide arbitrarily this predetermined number of transaction achievement. In the case when a payment delay within a predetermined number of days occurs in EC on this site 20, the rank of the company can be reduced by one. The owner of this site 20 can also decide arbitrarily this predetermined number of days. Furthermore, in the case when a payment delay longer than the predetermined number of days occurs or a condition that the owner of this site 20*a* arbitrarily decides such as two occurrences of payment delay within the predetermined number of days in three months is met, the transaction will be suspended. Otherwise, the rank remains as it is.

Input of the Buying Limit/Management of the Limit

The buying limit is determined in advance in correspondence with the ranks al to a5 as described above. For example, it is possible to set buying limits of five million yen for rank a1, four million yen for rank a2, . . . , and one million yen for rank a5. This buying limit is made associated with the rank.

The rank of selling limit (b1 to b5) is determined such that it corresponds to each rank (a1 to a5) of the buying limit. The selling limit is entered into each rank of these selling limits, and a debts and credits limit management authority 90 monitors whether the transaction is performed within the determined buying and selling limits to either warn or suspend the transaction when the transaction exceeds the limit. At this time, the monitored results are supplied to the mode of payment data 84 and fed back further to the above-mentioned judgment 3. The debts and credits limit management authority 90 further performs the management of settlement and the management of order accepting and ordering, and saves the electronic documents. The apprehension information data 82 and the complaint data 81 shown in FIG. 2 are created by the owner of this site 20 by entering these data arbitrarily, but in a preferred embodiment, the complaint information from the seller may be provided automatically to the complaint data 82.

By executing in real time the credit judgment of the present invention at this site on the network, it is possible to carry out safely a large-scale EC for B-to-B while maintaining anonymity on the network. Embodiments of EC using the system of the invention will now be described.

Participation in EC Risk Management Site

The company user, who can be either the seller or the purchaser, obtains certification from the external authentication agent 40. Then, the approval of the external certification and the certification in this site 20 are performed to attach the management number and the time limit. For the company user who is logging in this site, the management of the certification time limit is performed, and the management of the transaction authority is also performed based on the extent of the occurrence of complaints and apprehension information, if any. Then, the user is matched with the business profile data of, for example, COSMOS 2 stored in the company data 83. With the credit judgment process described in the above-described preferred embodiment, the credit judgment is performed for the company user in question to determine the selling and buying limits thereof. Also, the data of the mode of payment is fed back to make it reflected in the rank. Then, the company user who is done with the credit judgment logs on the transaction site. However, although the company user who has been judged as the rank of COD condition is capable of logging in the transaction site, the transaction is limited to only COD for the term of settlement.

Electronic Commerce

Figure 6:
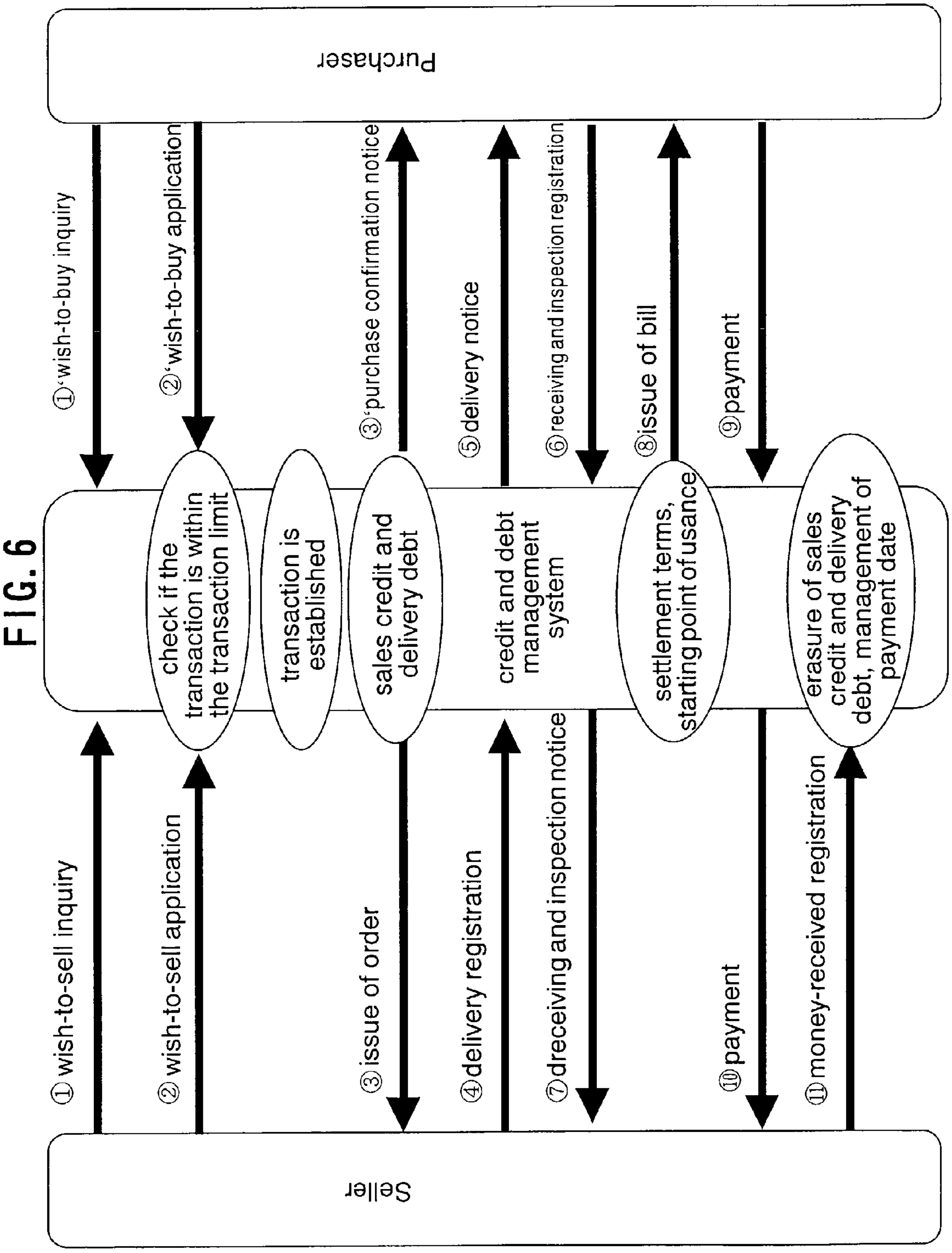
FIG. 6 illustrates a transaction flow of EC according to a preferred embodiment of the invention.

FIG. 6 shows a preferred embodiment of EC in the EC site built on the Internet. Among the company users that have logged on the EC site, the seller company makes a wish-to-sell inquiry to the EC site about merchandise that the user wishes to sell (Step 1). On the other hand, the purchaser company makes a wish-to-buy inquiry about desired merchandise presented to the EC site (Step 1'). Then, the purchaser company makes a wish-to-buy application (Step 2'), and the seller company makes a wish-to-sell application (Step 2). At this point, it is determined in the debts and credits management authority 90 whether the transaction is within the transaction limit or not, and If the transaction is within the transaction limit, then the transaction is established whereby an order accepting and ordering management system 91 is activated. At this time, a credit balance from the viewpoint of the site owner or the seller is generated on the purchaser company side whereas a merchandise book debt obligation from the viewpoint of the site owner or the purchaser is generated on the seller company side. The debts and credits management authority 90 manages these debts and credits, and an order is issued from the order accepting and ordering management system 91 to the seller company (Step 3) whereas a purchase confirmation notice is issued to the purchaser company (Step 3'). At the time when the seller company delivers a merchandise which is the object of the transaction, it makes a delivery registration to the order accepting and ordering management system 91 (Step 4) which in turn issues a delivery notice to the purchaser company (Step 5). After having received the merchandise, the purchaser company then makes a receipt and inspection registration to the order accepting and ordering management system 91 (Step 6) which in turn issues a receipt and inspection notice to the seller company (Step 7). At the time of settlement, the order accepting and ordering management system 91 issues a bill to the purchaser company (Step 8). The order accepting and ordering management system 91 stores notices issued in the above-described series of steps (Step 3 to Step 8) in the form of electronic documents. Then, changing to a settlement system 92, the purchaser company makes payment to the settlement system 92 (Step 9), which in turn makes payment to the purchaser company (Step 10). In another embodiment, the seller company and the purchaser company may be able to settle the transaction through a settlement organization such as an existing bank. The seller company then makes the registration of receipt of money to the settlement system 92 which, in response to the registration, erases both the credit balance for the purchaser company and the merchandise book debt obligation for the seller company and, at the same time, performs management for the payment date. Specifically, the settlement system 92 checks if the money is received by the due date and records the status of the payment in the mode of payment data 84. The settlement system 92 also gets hold of the credit balance for the purchaser company, determines whether the credit balance is within the limit or not and, if it exceeds the limit, makes further transaction impossible. On the other hand, the settlement system 92 gets hold of the delivery accounts payable debt balance for the seller company, determines whether this delivery debt balance is within the limit or not and, if it exceeds the limit, makes further transaction impossible. The settlement system 92 also records complaints and the like from the seller and purchaser companies in the complaint data and, at the same time, mails a notice automatically to the seller and purchaser companies. In another preferred embodiment, by the authority of the site owner, the transaction authority can be deprived from a company depending upon the level of complaints, apprehension information, bankruptcy information, dishonor of bill, seizure and the like. Besides, EC in the above-described embodiment may comprise anonymity such that only the site owner can identify the names of purchaser and seller companies participating in the transaction but the purchaser and the seller, that is, the participants in the transaction cannot identify the company name of each other. In this case, by taking advantage of this anonymity without being restricted by affiliated sales and the like in the real world, it is possible to carry out EC with different counter parties than those in the transaction in the real world and in different transaction quantities than those in the real world. More detailed embodiment about this anonymous transaction will be described later.

Figure 7:
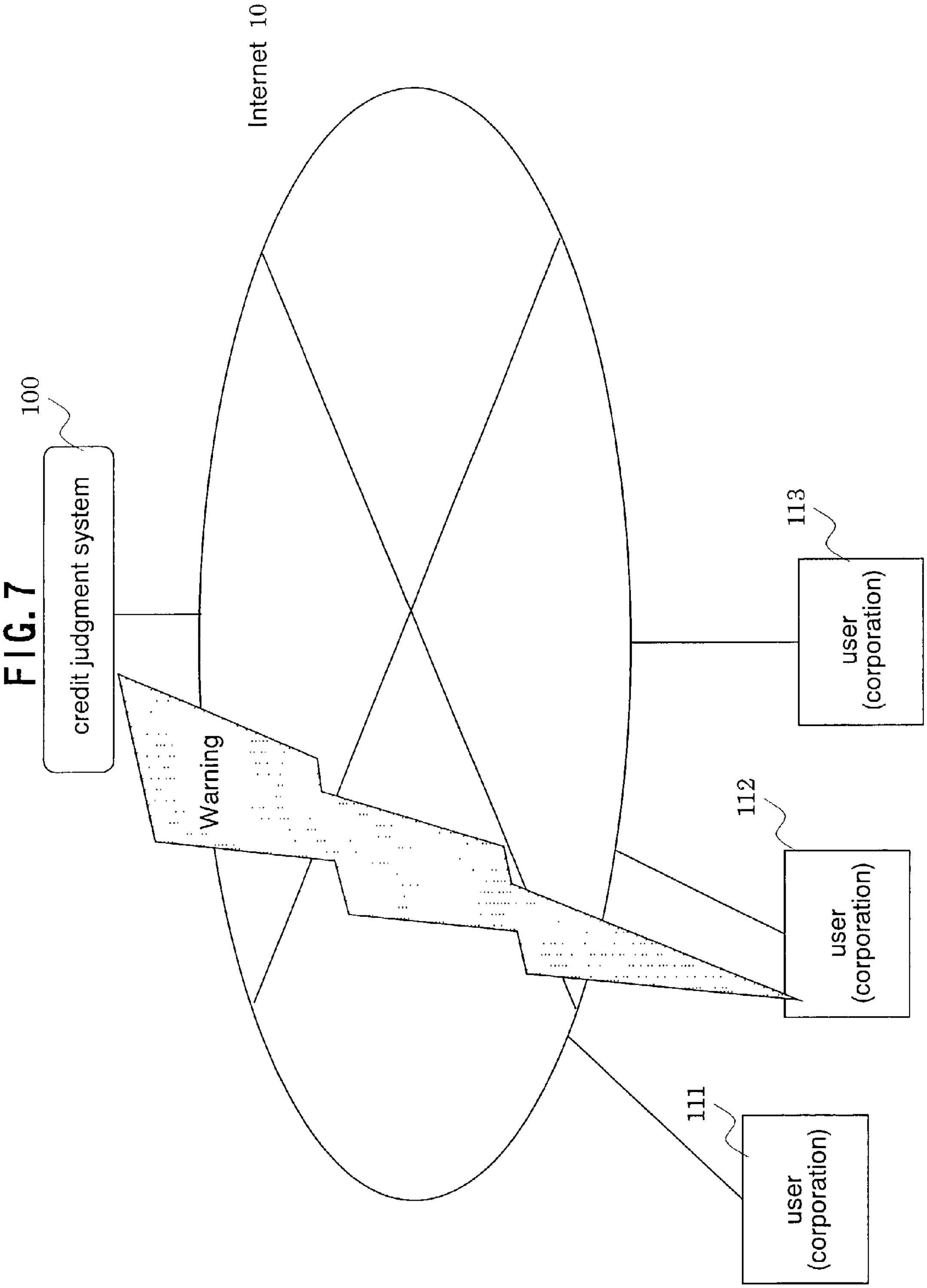
FIG. 7 illustrates an EC model according to another preferred embodiment of the invention.
Figure 8:
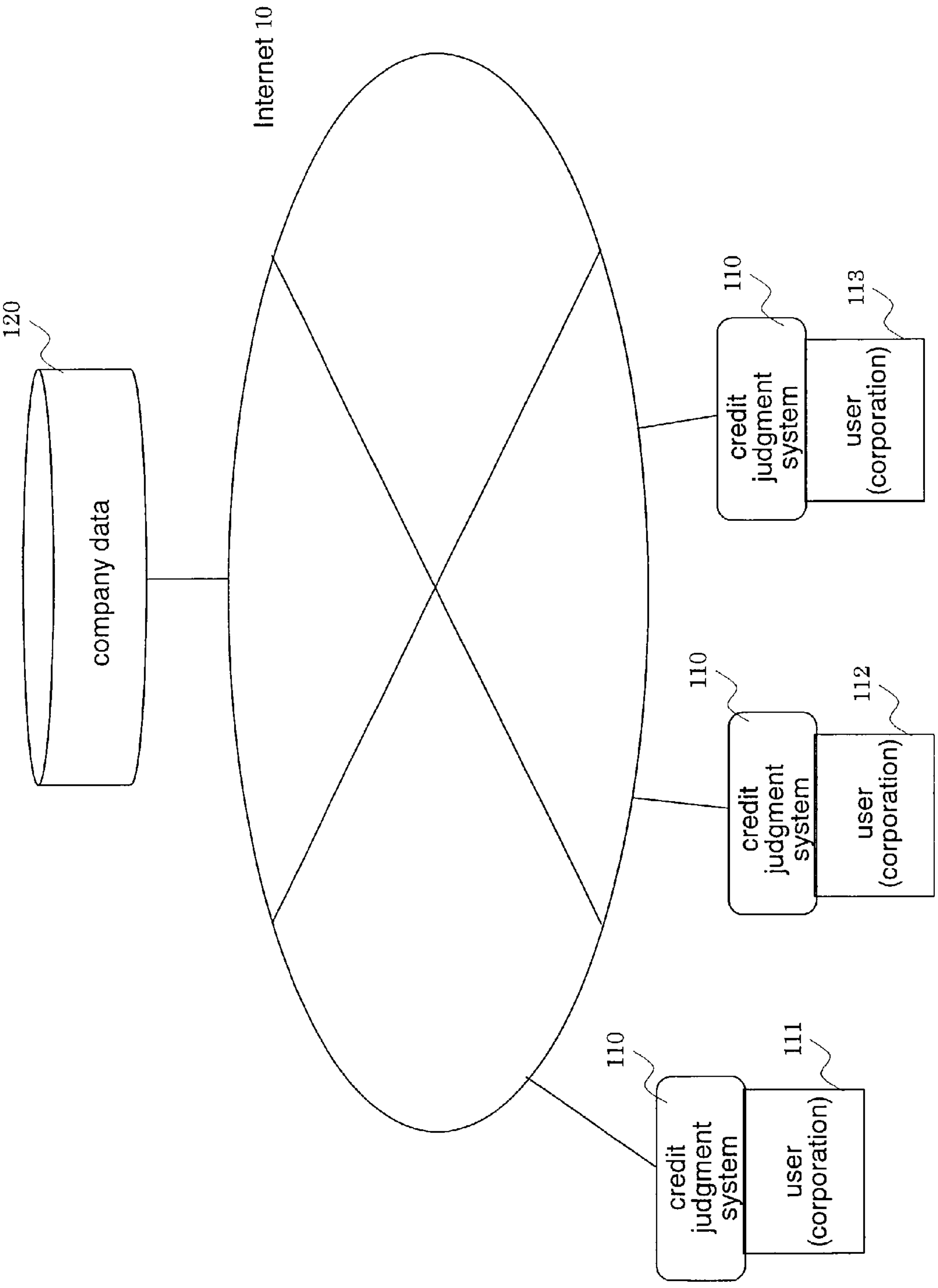
FIG. 8 illustrates the EC model according to still another preferred embodiment of the invention.
Figure 9:
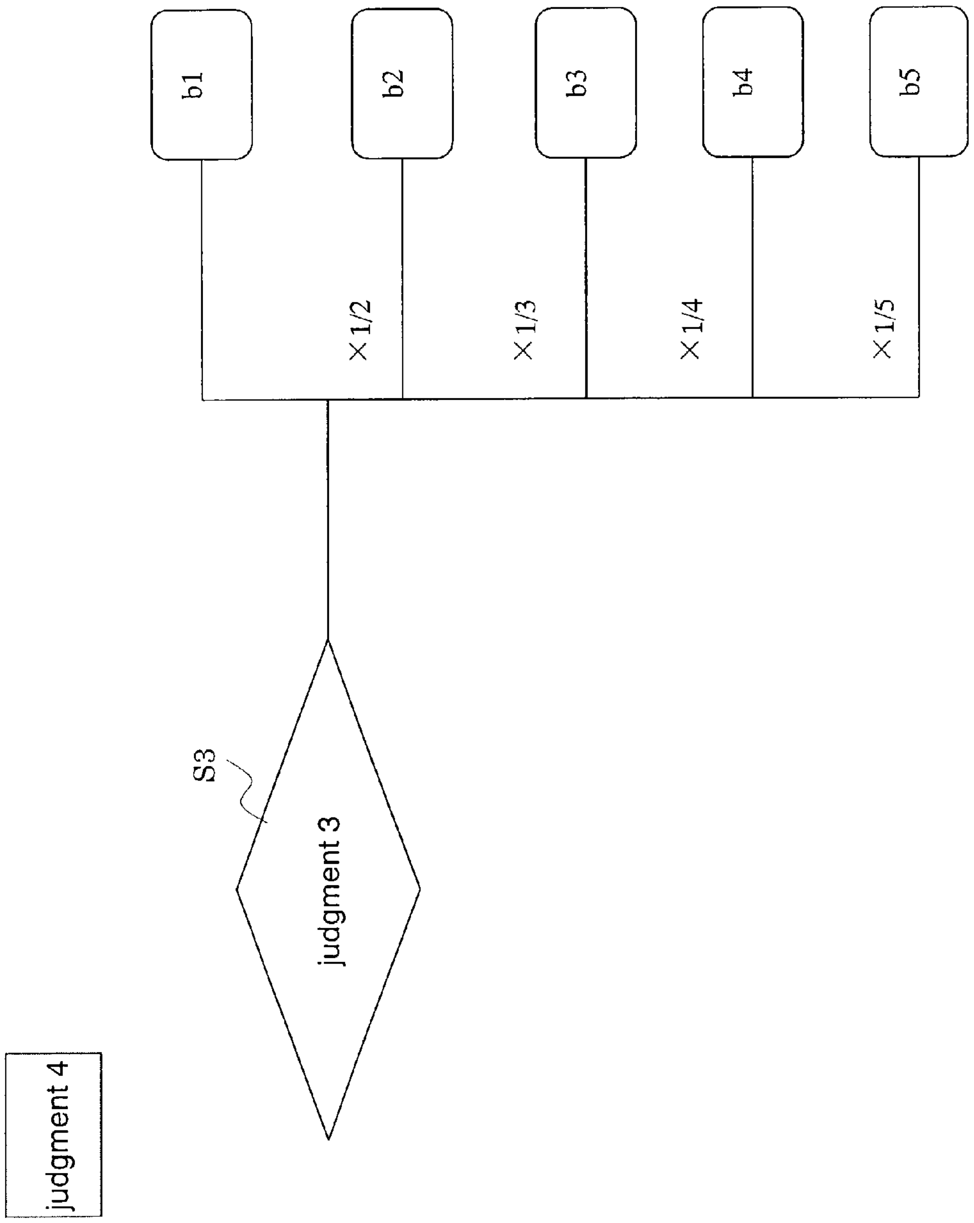
FIG. 9 illustrates the block chart showing the method for determining the buying limit in the EC model according to other preferred embodiment of the invention.

The foregoing embodiment is an example of EC at the EC site built on the Internet 10. As another preferred embodiment of the invention, the credit judgment according to the invention can also be provided in the form of ASP (an application service provider) as shown in FIG. 7. Now, in FIG. 9 is shown a particular example of judgment 4 as a next step of judgment 3 (S3) described in FIG. 2. At the site of a particular ASP, it is possible to activate a computer program capable of providing the credit judgment method of the invention, enter a suitable buying limit that is matched to the capacity of respective user based on judgment 4 shown in FIG. 9 for the users (the corporations) 111, 112, 113, . . . involved in EC through the Internet 10, perform the credit judgment for a company with which each user wishes to conduct a transaction, and send each user the transaction limit through the Internet 10 or, if the transaction limit exceeds, send each user a warning for suspending the transaction or reducing the transaction through the Internet 10.

In still another preferred embodiment, it is possible to perform the credit judgment according to the invention on the user's computer, by packaging either all or a portion of the computer program capable of providing the credit judgment according to the invention. In this case, although the program executing the algorism of the credit judgment operates as the credit judgment system 110 on a user-side computer, the company data 120 that needs to be updated successively is accessible over a computer network such as the Internet 10.

Preferred Embodiment for Real Time Credit Information Retrieval

FIG. 10 to FIG. 15 shows schematically a user-side terminal screen for providing a real time credit information retrieval service using the credit judgment system according to a preferred embodiment of the invention.

FIG. 10 shows an example of an initial input certificate page 3200 on a terminal, which can be displayed to the user utilizing the real time credit information retrieval service using the credit judgment system according to the invention. The input terminal screen is preferably configured by a graphical user interface (GUI) adapted not only to a keyboard but also to a pointing device such as a mouse.

The user who utilizes the real time credit information retrieval service enters a predetermined user ID into a field 3210 and a predetermined password into a field 3220 by use of a predetermined input device. After having entered these predetermined items, the user agrees to the terms of use and, if the user wishes to utilize the service, clicks a button 3230. If the user does not agree to the terms of use and not utilize the service, then the user clicks a button 3240.

The credit judgment system according to the invention is provided with a company information database system for storing company information about the user company. FIG. 11 shows an example of a predetermined corporate profile 3300 displayed after the user clicks the button 3230. This displayed corporate profile is the predetermined information stored in the company information database. In a preferred embodiment, the user can correct the corporate profile displayed in the field 3310 on the page. It is preferred that the user's company information corrected on the user-side terminal can be reflected in real time in the user information database. The user browses the relevant corporate profile and, if no more service is needed, can return to the previous page 3200 by clicking a button 3320. Based on this corporate profile, if the user wishes to utilize the real time credit information retrieval service, the user can click a confirmation button 3330. Also, if the user wishes to utilize the real time credit information retrieval service based on accounting information that is more detailed than the corporate profile of interest, the user can click a detail button 3340.

FIG. 12 shows an example of an input page 3400 for detailed accounting information displayed when the user clicks the above-described detail button 3340. In order to utilize a more precise real time credit information retrieval service, the user can enter a necessary data into given each item of a balance sheet or the like in the page 3400. In a preferred embodiment, the user can enter actual amounts of money. In another embodiment, the user can enter a percentage of each item to the total assets or to the total liabilities. After having entered necessary data to each item, the user can click the confirmation button 3420 to utilize the more precise real time credit information retrieval service. If the real time credit information retrieval service is utilized without entering particular accounting information but based on the existing corporate profile, the user can click a button 3410 to display the page 3300.

Figure 13:
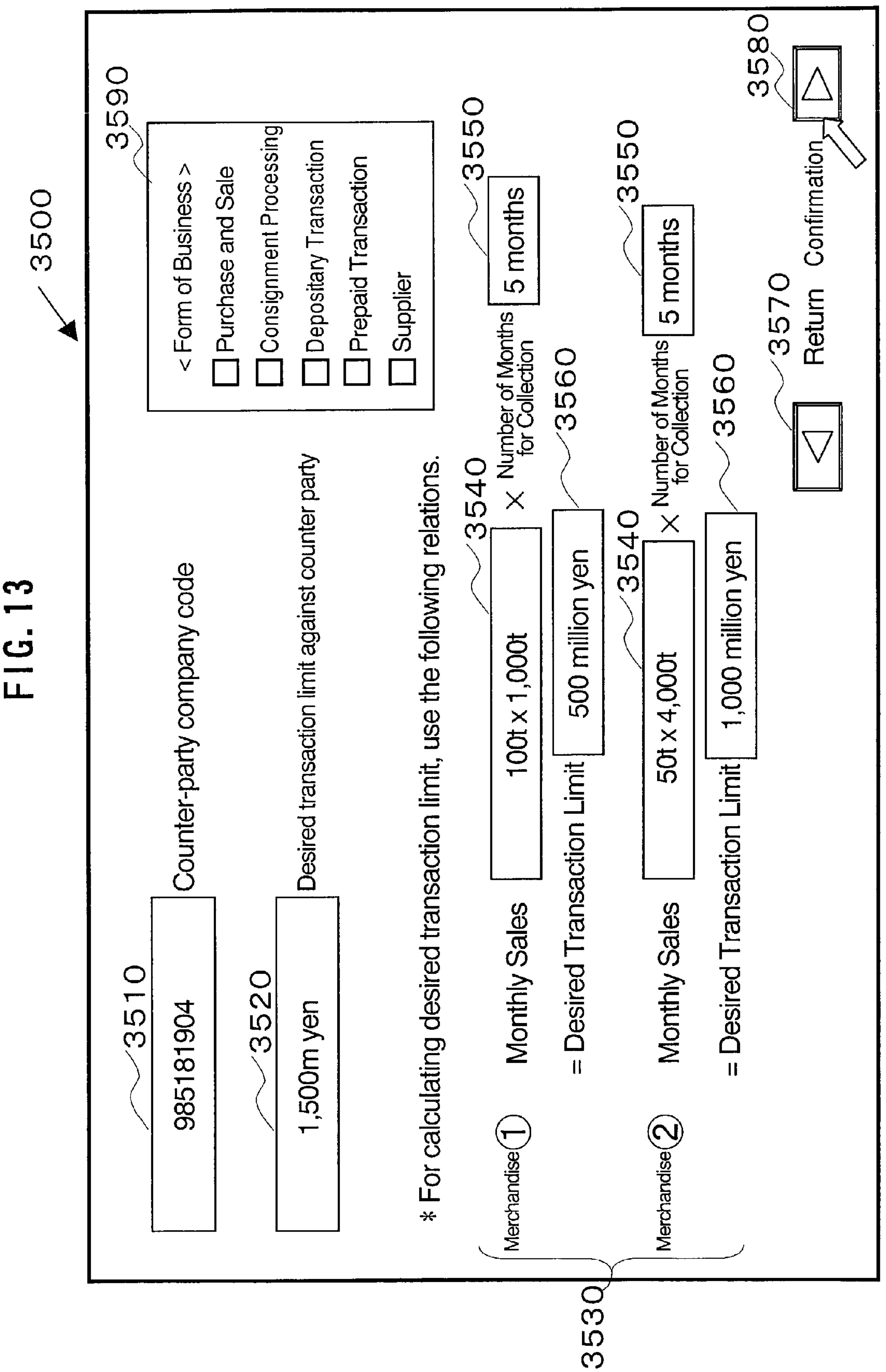
FIG. 13 illustrates an example of the page for entering the terms of transaction against a counter-party company in the real time credit information retrieval service according to a preferred embodiment of the invention.

FIG. 13 shows an example of a counter party input page 3500 displayed when the user clicks the confirmation button 3330 on the page 3300 or the confirmation button 3420 on the page 3400. The user can enter the predetermined ID code of the counter-party company. In a preferred embodiment, Tokyo Shoko Research (TSR) company code can be utilized. Also, in another embodiment, the user can directly enter or select a company name registered in a given database. The user can also enter into a field 3520 the desired transaction limit against the counter-party company. In addition, the user can specify a buying and selling form against the counter-party company. In a preferred embodiment, a list of predetermined buying and selling forms 3590 is displayed so that the user can select any buying and selling form. In a preferred embodiment, an input field 3530 may be provided so that the desired transaction limit can be calculated on the page. As an example of the input field, as shown by the reference numeral 3530, the user can fill a "monthly sales" field 3540 and a "number of months for collection" field 3550. It is possible to program that, after the user has entered desired values into these fields, the result obtained by performing the calculation among the fields is displayed in a field 3560. In a preferred embodiment, it is possible to program that the product of both values entered respectively in the monthly sales field 3540 and the number of months for collection field 3550 is displayed in the desired transaction limit field 3560.

After having entered the counter-party company and the desired transaction limit against this counter-party company, the user can proceed to the next step by clicking the confirmation button 3580. If the user does not wish the service any more, then the user can return to the previous page 3300 or 3400 by clicking a button 3570.

Figure 14:
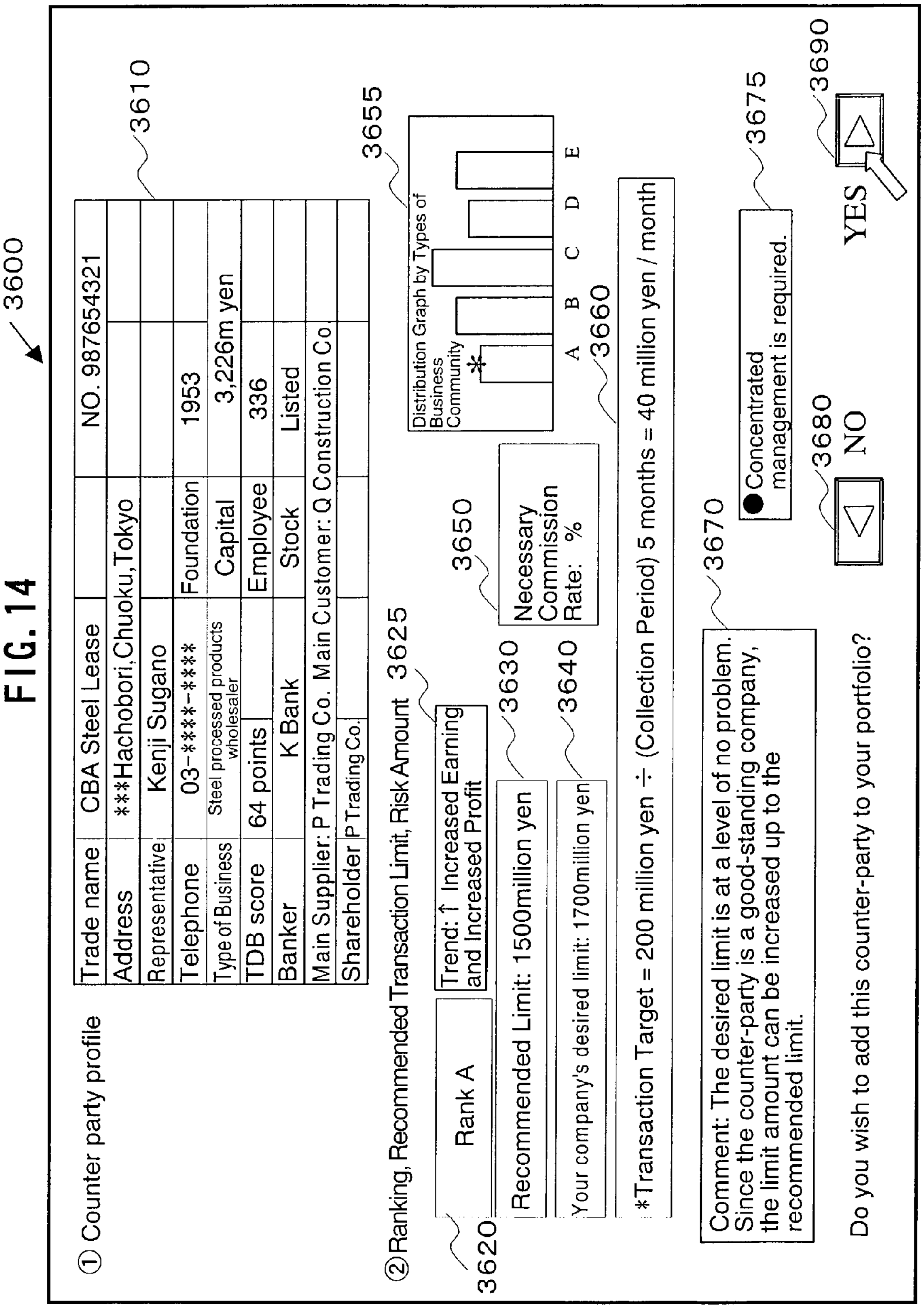
FIG. 14 illustrates an example of the page displaying the credit information of the counter-party company in the real time credit information retrieval service according to a preferred embodiment of the invention.

FIG. 14 shows an example of the page 3600 displaying the retrieval result of the real time credit information retrieval service and the calculation result, displayed when the user clicks the confirmation button 3580 on the page 3500.

As an example of the retrieval result, it is possible to display a profile 3610 of the counter-party company. It is also possible to display in a field 3620 the result of the credit judgment with ranking thereof. In a preferred embodiment, this evaluated rank is compared with the previously evaluated rank so that the trend of the credit judgment can be displayed (3625). Also, it is possible to specify in what ranking the counter-party company in question is placed in the relevant business field and, in a preferred embodiment, this can be displayed clearly by use of a graph 3655. Furthermore, a recommended transaction limit calculated by this system can be displayed in a field 3630. The desired transaction limit entered in the field 3520 of the page 3500 by the user can also be displayed in the field 3640 of the page 3600, and could be presented to the user in contrast to the recommended transaction limit.

Further, a commission rate that is a measure for the user to determine it as the minimum rate necessary can be displayed in a field 3650. In a preferred embodiment, the commission rate can be obtained from the following relational expression (1).

$$\text{minimum commission rate} = d + \text{capital cost rate} + \text{expense rate} \quad (1)$$

Here, d is a bankruptcy probability corresponding to each rank obtained by this system. This bankruptcy probability is calculated from the rank by a statistical technique and is preferably set within the range from 0.05% to 10%. In a preferred embodiment, a predetermined industry's average value could be used for the capital cost rate. In another preferred embodiment, it can be obtained from the following relational expression (2).

$$\text{capital cost rate} = (\text{own capital} \times \alpha + \text{interest payable}) / (\text{debt payable} + \text{own capital}) \quad (2)$$

Here, an arbitrary coefficient a is calculated statistically for each business field, which is preferred to have the value of 2.0% that takes a dividend, corporation tax, and the like into consideration. In a preferred embodiment, a predetermined industry's average value could be used for the expense rate. In another preferred embodiment, it can be obtained from the following relational expression (3).

$$\text{expense rate} = \text{sales management expense} / \text{sales amount} \quad (3)$$

Furthermore, a transaction target can be displayed in a field 3660. Here, in a preferred embodiment, the transaction target can be obtained from the following relational expression (4).

$$\text{transaction target amount} = (\text{recommended limit in the field 3630} - \text{desired limit in the field 3640}) / \text{collection period 3550} \quad (4)$$

Here, in the case when the recommended limit is more than the desired limit, it becomes possible to present an extended transaction target amount because the transaction target amount becomes a plus and, on the contrary, in the case when the recommended limit is less than the desired limit, a reduced transaction target amount will be presented because the transaction target amount becomes a minus.

By presenting the above-described minimum necessary commission rate and the transaction target to the user, a real time credit information consulting becomes possible. Further, in a preferred embodiment, it may also be possible not only to provide the above-described value but also to display an appropriate comment in a field 3670. As for this comment, it is preferred to display a pre-registered comment depending on the values of the necessary minimum commission rate and the extended transaction target amount. In another preferred embodiment, a concentrated credit management display 3675 can be displayed. The concentrated credit management refers to providing a high rate credit under a predetermined condition, if the counter-party company in question is an important customer. In this case, it is required to always keep grasping the business state of the customer and to perform such management that, even when the credit state of the customer turns worse, measures such as cooperation of rationalization, cooperation of assistance, participation in management, or suspension of transaction or withdrawal can be taken immediately. In a preferred embodiment, in the case when the user's monthly selling amount exceeds 15% of the monthly business amount of the counter-party company (that is, when the seller sells its merchandise in a month amounting 15% of the monthly business amount of the counter party), this counter-party company is called a concentrated counter party. When the above-described situation is the case, the credit management system according to the invention can display an alert of "Concentrated management is required" 3675. Further, in another preferred embodiment, it is possible not only to provide such single credit information but also to manage, compare, and present the information of plurality of counter parties. If desired, the user can click a portfolio button 3690 on the page 3600 to compare the information about plurality of counter-party companies. If the user does not wish to have the comparison of information about plurality of counter-party companies, the user can click a button 3680 to return to the previous page 3500.

FIG. 15 shows an example of a customer portfolio management page 3700, which is displayed after the user clicks a button 3690. In a preferred embodiment, a portfolio for each form of selling and buying can be displayed on the page. In this portfolio management, the trade name of the counter-party company, the rank, trend of the rank, presence of the concentrated management, the recommended limit, the desired limit, the credit balance, the update date, and predetermined follow-up items can be included as management items. Here, the predetermined follow-up item refers to the item such as the change of the president of the counter-party company, the change of the main bank, increase of the capital, the underlying asset, and the change of the company name. By providing the user with these follow-up items in real time or by daily batch processing, the portfolio management of higher quality can be provided. In a preferred embodiment, the user can rearrange the counter-party companies according to the rank evaluated by the present system by clicking a button 3720, rearrange the counter-party companies according to the limit by clicking a button 3730, or rearrange the counter-party companies in the order of the update date by clicking a button 3740. It is also preferred that the values for the desired limit and the credit balance can be modified freely by the user. When the user wishes to return to the information retrieval for individual counter-party company, the user can click a button 3750 to return to the previous page 3600. Also, if the user wishes to have various financial services in EC with a counter-party company, the user can click a button 3760.

Financial Services in EC

Figure 16:
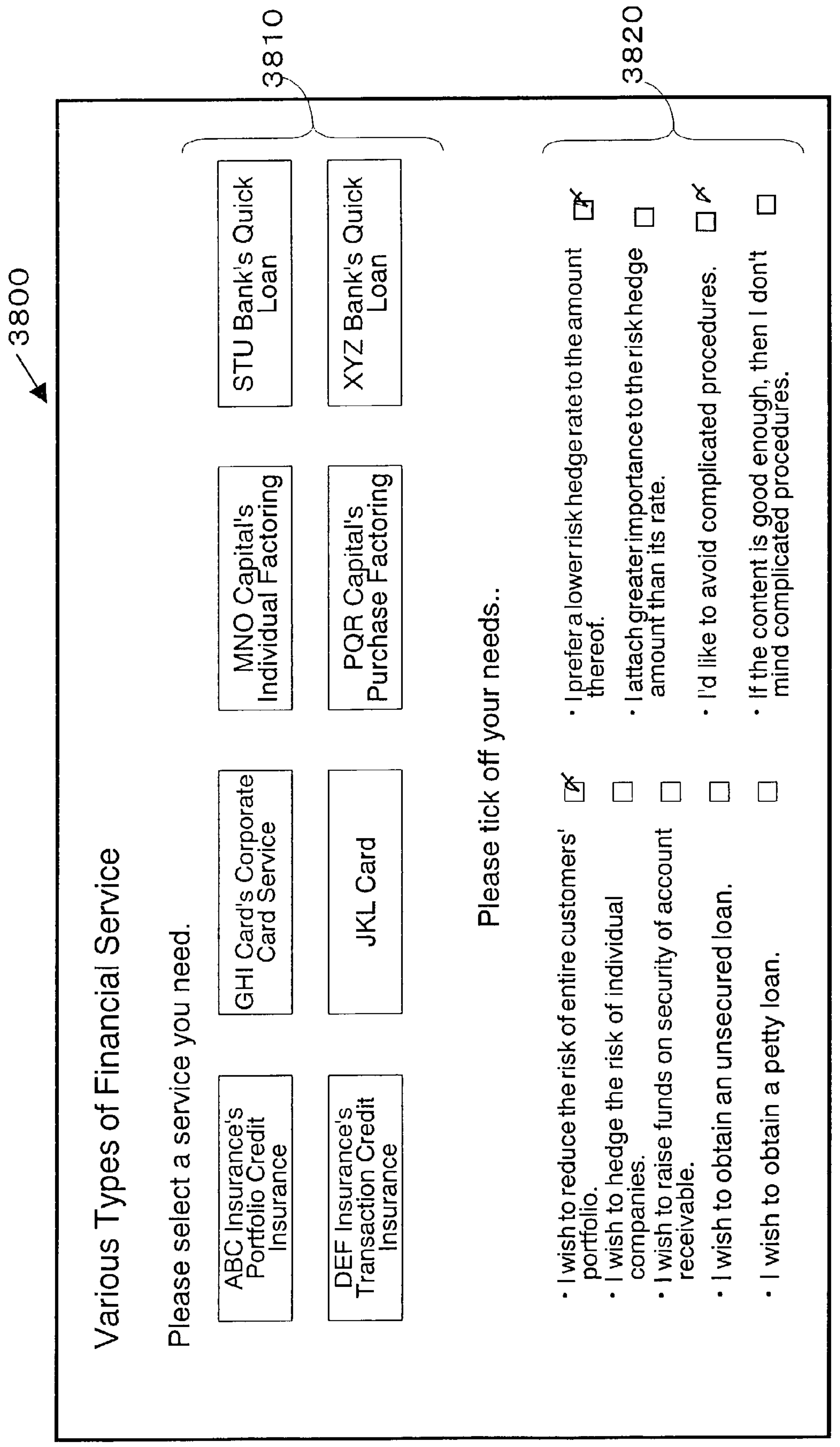
FIG. 16 illustrates an example of the page for providing various financial services in EC according to still another preferred embodiment of the invention.

In still another embodiment, it is possible to provide the user in EC according to the present invention with various financial services. FIG. 16 shows an example of a terminal-side screen 3800 with a user interface, which enables the user to select a financial service when conducting EC with a counter-party company. In a preferred embodiment, the user can click a button 3810 which a desired financial service is indicated thereon. Also, when selecting a predetermined financial service, the user can set a specific condition. In a preferred embodiment, a user interface 3820 that displays a list of specific conditions can be provided beforehand, and the user can select one or more conditions through an input device. In FIG. 16, there is shown an example where three different conditions, "I wish to reduce the risk of the entire customer portfolio.", "I prefer a lower risk hedge rate to the amount thereof.", and "I would like to avoid complicated procedures.", are selected.

By performing the above-described credit judgment in real time using the system according to the present invention, a large-scale B-to-B credit transaction can be performed safely with maintaining anonymity. In addition, it is possible to provide a credit judgment service of higher quality by portfolio management of plurality of counter-party companies. In particular, by providing the information of predetermined counter-party companies approximately in real time or updating daily, a more flexible credit judgment service can be provided. Further, various financial services can be provided when conducting a commercial transaction with a portfolio managed counter-party company.

We claim:

1. A real-time commercial credit scoring method for allowing inter-business commercial transactions for user companies to be performed through an application service provider (ASP) site on a computer network in which a computer system is operated, said computer system including transactor certifying means, rank setting means, transaction-data managing means, transaction limit setting means and transaction restricting means and complaint information mailing means, the method comprising the steps of:

certifying in real-time as a transactor, with said transactor certifying means, a person intended to participate as an anonymous seller or purchaser company newly in a commercial inter-business transaction on said site when said person satisfies a given condition, determining a rank of said certificated transactor in real-time, with said rank setting means, based on a given company data including at least one of a capital, sales amount, and transaction history about said transactor, organizing and managing in real-time a given transaction data, with said transaction-data managing means about a previous transaction through said site for said certified transactor, wherein said transaction data includes information about said transactor's mode of payment in said transaction, wherein said transaction-data managing means is configured to check said information of said transactor's mode of payment at given time intervals to reflect said checked information on said company data; and determining in real-time a transaction limit in said transaction, with said transaction limit setting means of said transactor based on said rank determined by said rank setting means, wherein said rank setting means is configured to determine said rank according to a given condition while making reference to said transaction data in said transaction-data managing means;

placing a certain restraint on said transaction, with said transaction restricting means, and giving a warning to said seller or purchaser companies or suspending said transaction when the amount of said transaction exceeds said transaction limit of said seller or purchaser companies;

wherein said transaction restriction means being operable in real-time on said application service provider site responsive to said excess over said transaction limit to give a warning to said seller or purchaser companies, or to suspend said transaction via said computer network; and recording complaints from the seller and purchaser companies in the complaint data, with said complaint information mailing means, and mailing a notice automatically to the seller and purchaser companies.

2. The real-time commercial credit scoring method as defined in claim 1, which further includes the step of identifying said transactor by a specific identification marker so as to allow said purchaser or seller companies to selectively conduct said transactions through said ASP, while allowing at least an owner of said ASP to know a name including a company name of said person participating in said transaction.

3. A The real-time commercial credit scoring method for providing corporate credit information to a user terminal through an application service provider site on a computer network in which a computer system is operated, said computer system including transactor certifying means, company information managing means, transaction evaluation means and rank setting means, wherein said rank setting means is operable in real-time on said application service provider site to determine a rank of said certificated transactor based on a given company data including at least one of a capital, sales amount, and transaction history about said transactor, wherein said transaction data includes information about said transactor's mode of payment in said transaction, wherein said rank setting means is operable in real-time on said application service provider site to check said information of said transactor's mode of payment at given time intervals to reflect said checked information on said company data; said commercial credit scoring method comprising the steps of:

certifying as a user a person intended to anonymously access said credit information when said person satisfies a given condition by said transactor certifying means;

providing the company information of a desired counter-party company to said certified user by said company information managing means;

prompting said certified user to enter a desired transaction limit in an anonymous commercial inter-business transaction with the counter-part company;

evaluating said entered desired transaction limit and said company information of said desired counter-party company by said transaction evaluation means so as to provide a diagnosis of security in said transaction to said user approximately in real time;

calculating a probability of bankruptcy in said counter-party company based on said rank determined by said rank setting means on said application service provider site;

setting a sum of at least said bankruptcy probability, a capital cost rate of said counter-party company and an administration expense rate of said counter-party company as a minimum requisite commission rate;

providing said minimum requisite commission rate to said certified user via said computer network;

recording complaints from seller and purchaser companies in complaint data; and mailing a notice automatically to the seller and purchaser companies.

4. The real-time commercial credit scoring method as defined in claim 3, which further includes the step of prompting said certified user to correct the company information of said user through a user terminal.

5. The real-time commercial credit scoring method as defined in claim 3, wherein said step of prompting said certified user to enter said desired transaction limit includes the steps of prompting said certified user to enter at least monthly transition value and a number of months for payback, and multiplying said entered monthly transition value by said entered number of months for payback to determine said desired transaction limit.

6. The real-time commercial credit scoring method as defined in claim 4, wherein said step of prompting said certified user to enter said desired transaction limit includes the steps of prompting said certified user to enter at least monthly transition value and a number of months for payback, and multiplying said entered monthly transition value by said entered number of months for payback to determine said desired transaction limit.

7. The real-time commercial credit scoring method as defined in claim 4, which further includes the steps of:

calculating the probability of bankruptcy in said counter-party company based on said rank determined by said rank setting means;

setting a sum of at least said bankruptcy probability, a capital cost rate of said counter-party company and an administration expense rate of said counter-party company as a minimum requisite commission rate; and providing said minimum requisite commission rate to said certified user.

8. The real-time commercial credit scoring method as defined in claim 5, which further includes the steps of:

calculating the probability of bankruptcy in said counter-party company based on said rank determined by said rank setting means;

setting a sum of at least said bankruptcy probability, a capital cost rate of said counter-party company and an administration expense rate of said counter-party company as a minimum requisite commission rate; and providing said minimum requisite commission rate to said certified user.

9. The real-time commercial credit scoring method as defined in claim 6, which further includes the steps of:

calculating the probability of bankruptcy in said counter-party company based on said rank determined by said rank setting means;

setting a sum of at least said bankruptcy probability, a capital cost rate of said counter-party company and an administration expense rate of said counter-party company as a minimum requisite commission rate; and providing said minimum requisite commission rate to said certified user.

10. The real-time commercial credit scoring method as defined in claim 3, which further includes the steps of:

dividing a difference between said transaction limit of said counter-party company and said desired transition limit by a number of months for payback to determine a target transaction value per month; and providing said target transaction value to said certified user.

11. The real-time commercial credit scoring method as defined in claim 4, which further includes the steps of:

dividing a difference between said transaction limit of said counter-party company and said desired transition limit by a number of months for payback to determine a target transaction value per month; and providing said target transaction value to said certified user.

12. The real-time commercial credit scoring method as defined in claim 5, which further includes the steps of:

dividing a difference between said transaction limit of said counter-party company and said desired transition limit by a number of months for payback to determine a target transaction value per month; and providing said target transaction value to said certified user.

13. The real-time commercial credit scoring method as defined in claim 6, which further includes the steps of:

dividing a difference between said transaction limit of said counter-party company and said desired transition limit by a number of months for payback to determine a target transaction value per month; and providing said target transaction value to said certified user.

14. The real-time commercial credit scoring method as defined in claim 7, which further includes the steps of:

dividing a difference between said transaction limit of said counter-party company and said desired transition limit by said number of months for payback to determine a target transaction value per month; and providing said target transaction value to said certified user.

15. The real-time commercial credit scoring method as defined in claim 8, which further includes the steps of:

dividing a difference between said transaction limit of said counter-party company and said desired transition limit by said number of months for payback to determine a target transaction value per month; and providing said target transaction value to said certified user.

16. The real-time commercial credit scoring method as defined in claim 9, which further includes the steps of:

dividing a difference between said transaction limit of said counter-party company and said desired transition limit by said number of months for payback to determine a target transaction value per month; and providing said target transaction value to said certified user.

17. The real-time commercial credit scoring method as defined in claim 3, wherein company information of one or more of counter-party companies is provided to a user by displaying a specific management page on a screen of a user terminal for comparison by the user.

18. The real-time commercial credit scoring method as defined in claim 3, which further includes the step of:

providing a given financial service to a user certified by user certifying means to conduct the anonymous commercial inter-business transaction with the counter-party company through an application service provider site on a computer network, wherein further comprising the steps of:

(i) prompting said user to select one or more of said financial services; and (ii) prompting said user to enter a condition for providing said financial service.

* * * * *